(12) United States Patent
Fujita et al.

(10) Patent No.: US 12,140,437 B2
(45) Date of Patent: Nov. 12, 2024

(54) TRANSPORT MANAGEMENT DEVICE AND TRANSPORT MANAGEMENT METHOD

(71) Applicant: ISUZU MOTORS LIMITED, Tokyo (JP)

(72) Inventors: Takafumi Fujita, Tokyo (JP); Masaki Uchida, Tokyo (JP); Ryo Kuranishi, Tokyo (JP); Takatoshi Hida, Tokyo (JP)

(73) Assignee: ISUZU MOTORS LIMITED, Tokyo (JP)

( * ) Notice: Subject to any disclaimer, the term of this patent is extended or adjusted under 35 U.S.C. 154(b) by 517 days.

(21) Appl. No.: 17/593,864

(22) PCT Filed: Mar. 24, 2020

(86) PCT No.: PCT/JP2020/013120
§ 371 (c)(1),
(2) Date: Sep. 27, 2021

(87) PCT Pub. No.: WO2020/203492
PCT Pub. Date: Oct. 8, 2020

(65) Prior Publication Data
US 2022/0187081 A1 Jun. 16, 2022

(30) Foreign Application Priority Data
Mar. 29, 2019 (JP) .................. 2019-068882

(51) Int. Cl.
*G01C 21/34* (2006.01)
*G06Q 10/0835* (2023.01)
(Continued)

(52) U.S. Cl.
CPC ... *G01C 21/3415* (2013.01); *G06Q 10/08355* (2013.01); *G08G 1/09* (2013.01); *G08G 1/123* (2013.01)

(58) Field of Classification Search
CPC .................................. G01C 21/3415
See application file for complete search history.

(56) References Cited

U.S. PATENT DOCUMENTS

2002/0026281 A1* 2/2002 Shibata .................. G08G 1/123
340/995.1
2017/0024688 A1 1/2017 Wiechers
(Continued)

FOREIGN PATENT DOCUMENTS

| CN | 102310830 A | 1/2012 |
| CN | 106372827 A | 2/2017 |

(Continued)

OTHER PUBLICATIONS

International Search Report from International Application No. PCT/JP2020/013120, mailed Jun. 30, 2020.

*Primary Examiner* — Shelley Chen
(74) *Attorney, Agent, or Firm* — Shih IP Law Group, PLLC

(57) ABSTRACT

Provided are a transport management device and transport management method serving to change a travel plan of a vehicle in accordance with a malfunction occurring with the vehicle. This transport management device manages a transport system for carrying out transport of cargo, or the like, by causing a vehicle to travel by autonomous driving to a destination on the basis of a travel plan. The transport management device determines whether to change the destination of the vehicle in accordance with an event occurring with the vehicle during travel by autonomous driving, and changes the destination if it is determined that the destination should be changed or does not change the destination if it is determined that the destination should not be changed.

4 Claims, 14 Drawing Sheets

(51) Int. Cl.
    *G08G 1/09*         (2006.01)
    *G08G 1/123*       (2006.01)

(56)            References Cited

U.S. PATENT DOCUMENTS

| | | | |
|---|---|---|---|
| 2018/0299285 A1 * | 10/2018 | Morita | G01C 21/3492 |
| 2018/0335774 A1 | 11/2018 | Sato | |
| 2018/0348769 A1 | 12/2018 | Sato et al. | |
| 2020/0139990 A1 | 5/2020 | Hiruma | |

FOREIGN PATENT DOCUMENTS

| | | | | |
|---|---|---|---|---|
| CN | 107561996 A | | 1/2018 | |
| CN | 108983768 A | | 12/2018 | |
| CN | 208273132 U | | 12/2018 | |
| JP | H01241604 A | * | 9/1989 | |
| JP | 2000172992 A | * | 6/2000 | G08G 1/123 |
| JP | 3957477 B2 | * | 8/2007 | |
| JP | 2007-290489 A | | 11/2007 | |
| JP | 2009161345 A | * | 7/2009 | |
| JP | 2009-269682 A | | 11/2009 | |
| JP | 2017-202708 A | | 11/2017 | |
| JP | 2018-077068 A | | 5/2018 | |
| JP | 2018-169689 A | | 11/2018 | |
| JP | 2018-195121 A | | 12/2018 | |
| JP | 2019-008540 A | | 1/2019 | |
| WO | WO-2017111126 A1 | * | 6/2017 | G01C 21/34 |

* cited by examiner

TRANSPORT MANAGEMENT DEVICE AND TRANSPORT MANAGEMENT METHOD

TECHNICAL FIELD

The present disclosure relates to a transportation management apparatus and a transportation management method.

BACKGROUND ART

Conventionally, a technique has been disclosed in which, when an anomaly occurs in a vehicle autonomously driving based on a first travel plan, the first travel plan is changed to a second travel plan for stopping the vehicle based on the cause of the anomaly and the surrounding situation (see, e.g., Patent Literature (hereinafter referred to as "PTL") 1).

CITATION LIST

Patent Literature

PTL 1
Japanese Patent Application Laid-Open No. 2019-8540

SUMMARY OF INVENTION

Technical Problem

However, there are cases where it is better to change the travel plan and cases where it is not, depending on the anomaly in the vehicle that has occurred.

In this connection, the present disclosure aims to provide a technique of changing the travel plan for the vehicle depending on the anomaly in the vehicle that has occurred.

Solution to Problem

A transportation management apparatus according to one aspect of the present disclosure is a transportation management apparatus that manages a transportation system for causing a vehicle to perform unmanned autonomous travel to a destination based on a travel plan to transport goods or the like, the transportation management apparatus being configured to: judge, depending on an event occurring in the vehicle performing the unmanned autonomous travel, whether or not the destination of the vehicle is to be changed, and change the destination when it is judged that the destination is to be changed, or not change the destination when it is judged that the destination is not to be changed.

Further, a transportation management method according to one aspect of the present disclosure is a transportation management method for managing a transportation system for causing a vehicle to perform unmanned autonomous travel to a destination based on a travel plan to transport goods or the like, the transportation management method including: judging, depending on an event occurring in the vehicle performing the unmanned autonomous travel, whether or not the destination of the vehicle is to be changed; and changing the destination when it is judged that the destination is to be changed, or, not changing the destination when it is judged that the destination is not to be changed.

Advantageous Effects of Invention

According to the present disclosure, it is possible to provide a technique of changing a travel plan for a vehicle depending on an anomaly in the vehicle that has occurred.

DESCRIPTION OF EMBODIMENTS

Hereinafter, an embodiment of the present disclosure will be described in detail with reference to the accompanying drawings. Note that, any unnecessarily detailed description, e.g., a detailed description of well-known matters, redundant descriptions on substantially the same configurations, and/or the like may be omitted.

It should be noted that the drawings described and referred to below are provided to enable a person skilled in the art to understand the present disclosure and are not intended to limit the scope of the claims of the present disclosure.

(One Example of Transportation System According to Embodiment of Present Disclosure)

Figure 1:
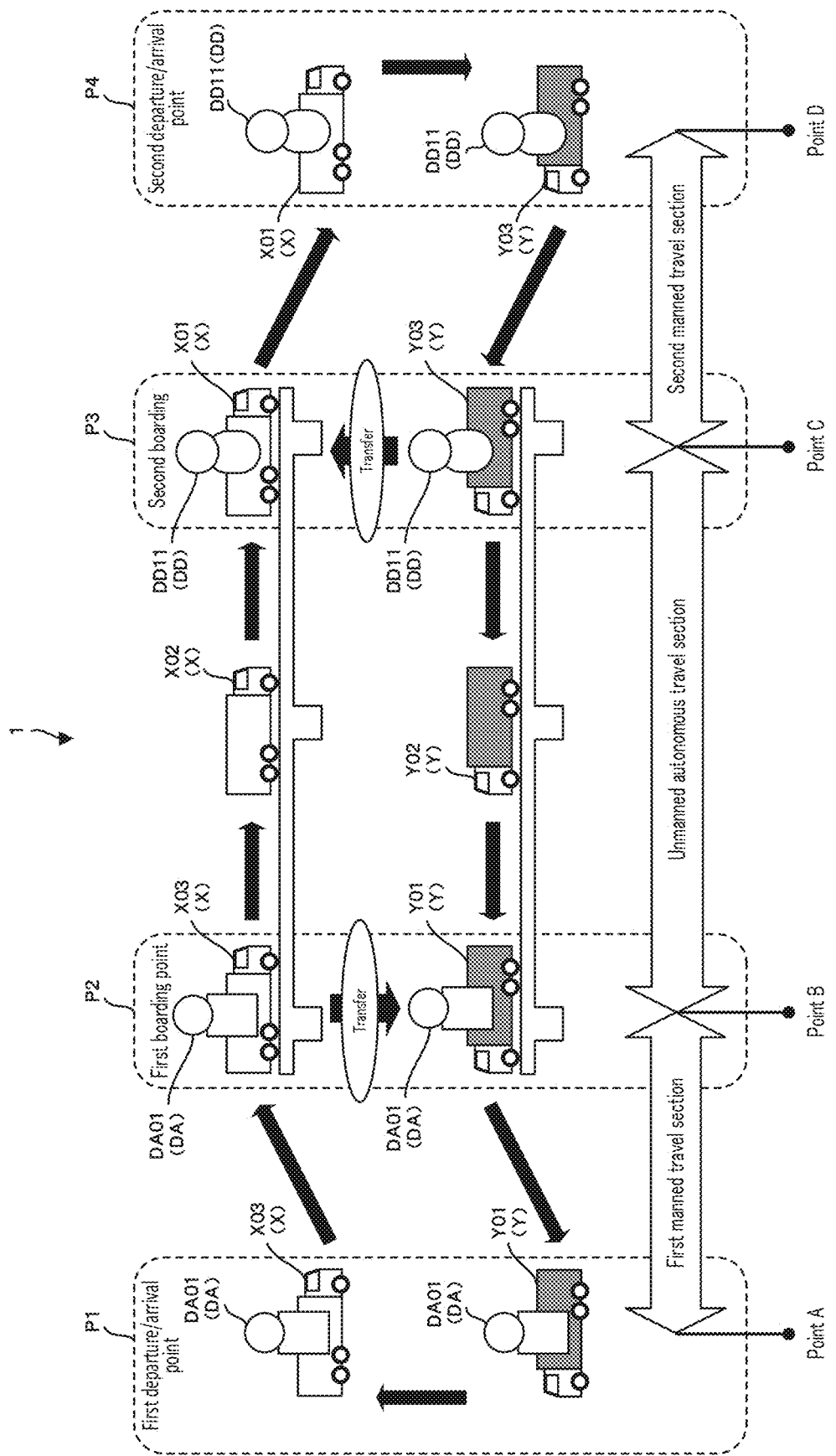
FIG. 1 illustrates a transportation system according to an embodiment of the present disclosure.

To begin with, one example of a transportation system according to an embodiment of the present disclosure will be described with reference to FIG. 1.

Transportation system 1 that is one example of the transportation system according to the embodiment of the present disclosure is a system for transporting goods (or passengers) from first departure/arrival point P1 to second departure/arrival point P4. First departure/arrival point P1 and second departure/arrival point P4 are, for example, a goods transportation hub (a loading location and an unloading location) or the like in the case of goods, and are, for example, a boarding location or the like in the case of passengers. Note that, in the embodiment of the present disclosure, first departure/arrival point P1 is referred to as point A, and second departure/arrival point P4 is referred to as point D.

There are first boarding point P2 and second boarding point P3 between first departure/arrival point P1 and second departure/arrival point P4. First boarding point P2 and second boarding point P3 are, for example, large car parking lots of smart interchanges (hereinafter referred to as "smart ICs") installed on a highway. Note that, in the embodiment of the present disclosure, first boarding point P2 is referred to as "point B," and second boarding point P3 is referred to as "point C."

Vehicles X (X01 to X03) are transportation vehicles that travel from point A toward point D, and vehicles Y (Y01 to Y03) are transportation vehicles that travel from point D toward point A. Note that, vehicles X (X01 to X03) arriving at point D next turn to be vehicles Y (Y01 to Y03) traveling from point D toward point A. In addition, vehicles Y (Y01 to Y03) arriving at point A next turn to be vehicles X (X01 to X03) traveling from point A toward point D.

A section from point A to point B is a first manned driving section where vehicle X (X03) and vehicle Y (Y01) are driven by first driver DA (DA01). The first manned driving section is, for example, a general-road travel section from point A to a smart IC on a highway nearest point A. First driver DA (DA01) drives vehicle X (X03) from point A to go to point B. Then, first driver DA (DA01) transfers to vehicle Y (Y01) at point B, and then drives vehicle Y (Y01) from point B to return to point A. Thus, a driving section in which first driver DA drives is only the first manned travel section.

A section from point C to point D is a second manned driving section where vehicle X (X01) and vehicle Y (Y03) are driven by second driver DD (DD11). The second manned driving section is, for example, a general-road travel section from point D to a smart IC on the highway nearest point D. Second driver DD (DD11) drives vehicle Y (Y03) from point D to go to point C. Then, second driver DD (DD11) transfers to vehicle X (X01) at point C, and then drives vehicle X (X01) from point C to return to point D. Thus, a driving section in which second driver DD drives is only the second manned travel section.

A section from point B to point C is an unmanned autonomous travel section in which vehicles X (X01 to X03) and vehicles Y (Y01 to Y03) autonomously travel without a driver on board. In the case of vehicles X (X01 to X03) traveling from point B to point C, the unmanned autonomous travel section is, for example, a highway travel section from the large car parking lot of the smart IC at point B through an up lane of the highway to the large car parking lot of the smart IC at point C. In addition, in the case of vehicles Y (Y01 to Y03) traveling from point C to point B, the unmanned autonomous travel section is, for example, a highway travel section from the large car parking lot of the smart IC at point C through a down lane of the highway to the large car parking lot of the smart IC at point B.

Thus, when goods are transported by vehicle X from point A to point D, first driver DA first drives vehicle X from point A to point B, and gets off vehicle X at point B. Vehicle X performs the unmanned autonomous travel from point B to arrive at point C. From point C, second driver DD drives vehicle X to transport the goods to point D. In addition, when the goods are transported by vehicle Y from point D to point A, second driver DD first drives vehicle Y from point D to point C, and gets off vehicle Y at point C. Vehicle Y performs the unmanned autonomous travel from point C to arrive at point B. From point B, first driver DA drives vehicle Y to transport the goods to point A.

According to the above-described method, transportation mode 1 according to the embodiment of the present disclosure transports goods (or passengers) from point A to point D and from point D to point A. The transportation management system according to the embodiment of the present disclosure is operated in such a transportation mode 1.

(Outline of Transportation Management System)

Figure 2:
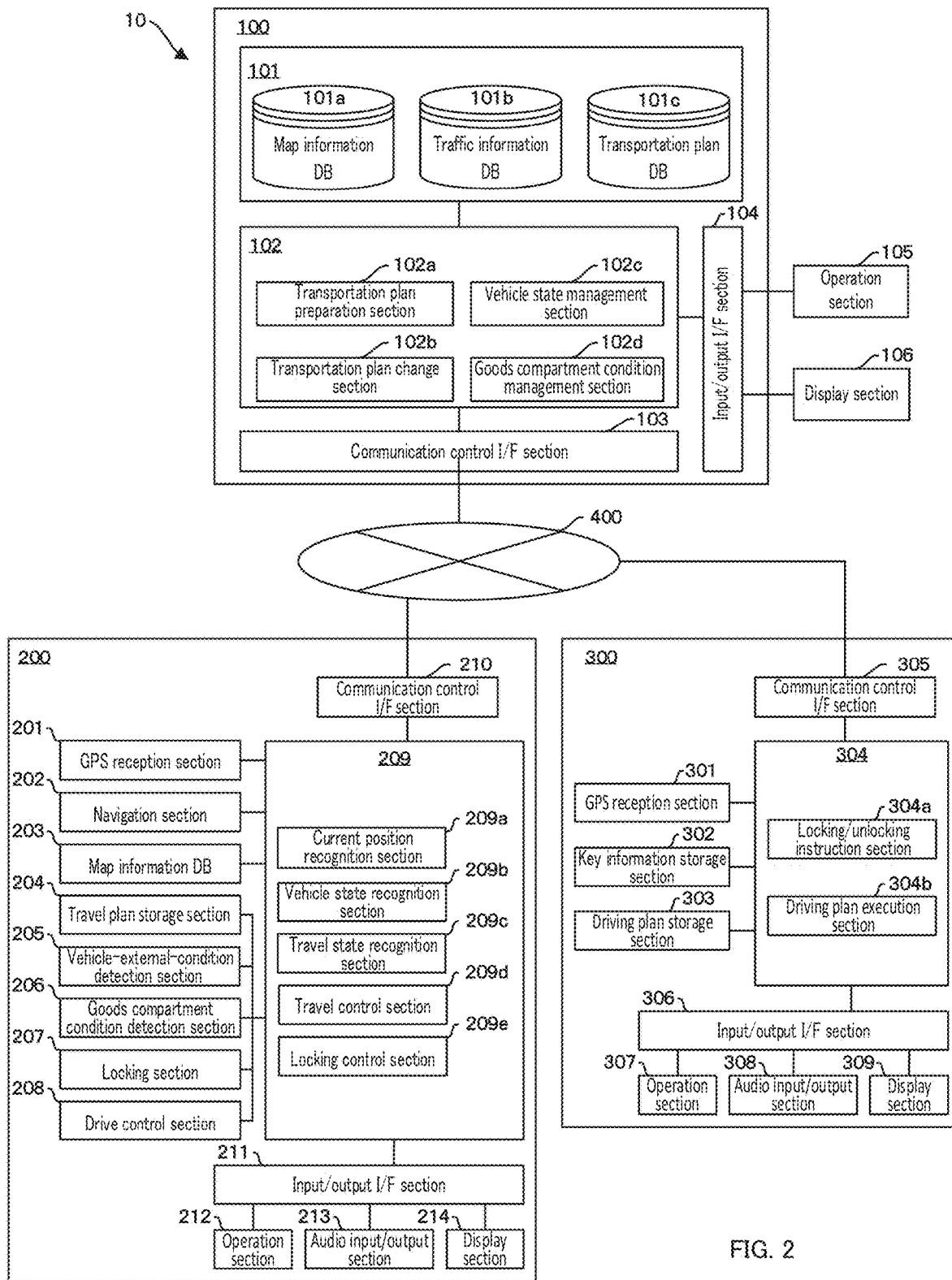
FIG. 2 illustrates a system configuration of a transportation management system according to an embodiment of the present disclosure.

Next, transportation management system 10 according to an embodiment of the present disclosure will be described with reference to FIG. 2.

Transportation management system 10 according to the embodiment of the present disclosure includes transportation management apparatus 100, in-vehicle system 200, and driver terminal 300.

(Transportation Management Apparatus)

Transportation management apparatus 100 is a server or the like installed in a headquarters that comprehensively manages transportation of goods from point A to point D and transportation of goods from point D to point A. In addition, transportation management apparatus 100 communicates with a plurality of external servers (not illustrated) through network 400, and obtains various information such as road traffic information and weather information. Transportation management apparatus 100 is communicably connected to in-vehicle system 200 and driver terminal 300 through network 400. Further, transportation management apparatus 100 is communicably connected with point-A management apparatus (not illustrated) installed at point A and point-D management apparatus (not illustrated) installed at point D. Accordingly, the information in transportation management apparatus 100 can be browsed also at point A and point D. Note that, transportation management apparatus 100 may be installed at point A and/or point D.

Transportation management apparatus 100 includes storage section 101, control section 102, communication control I/F (interface) section 103, and input/output I/F (interface) section 104. Operation section 105 and display section 106 are connected to input/output I/F section 104.

Storage section 101 stores therein map information database (DB) 101a, traffic information DB 101b, and transportation plan DB 101c.

Map information DB 101a includes map information. The map information includes various road information such as speed limit information, road type information, road width information, number-of-lanes information, tunnel information, elevation (sidewalk bridge, three-dimensional intersection, etc.) information, and the like in addition to road map information. The speed limit information is information indicating the speed limit in each section of each road. The road type information is information indicating the type of each road such as a highway, prefectural road, city road, and side road, the presence or absence of a right-turn lane and a left-turn lane, the presence or absence of an intersection and a turning point (road turn), the curvature of a curve, the inclination angle of the road, and the like. The road width information is information indicating the width of each road. The number-of-lanes information is information indicating the number of lanes on the road. The tunnel information is information indicating the distance of a tunnel and the height limit in the tunnel. The elevation information is information indicating the height limit of a pedestrian bridge or a three-dimensional intersection.

Traffic information DB 101*b* includes current road traffic information, future road traffic prediction information, and traffic congestion prediction information. The road traffic information is road traffic information on up and down lanes of each general road between point A and point B, road traffic information on up and down lanes of each general road between point C and point D, road traffic information on an up lane of a highway between point B and point C, road traffic information on a down lane of the highway between point C and point B, and the like.

The future road traffic prediction information is future road situation information on a road situation predicted to happen when an unexpected traffic event (e.g., traffic congestion or road closure due to occurrence of traffic congestion beyond an expected range of traffic congestion, an accident, a vehicle failure, a disaster, or the like) occurs. The road traffic information and future road traffic prediction information are obtained periodically (e.g., every 5 minutes) from a server of Japan Road Traffic Information Center, for example, and updated as necessary. Thus, traffic information DB 101*b* includes the current road traffic information and future road traffic prediction information between point A and point D.

The traffic congestion prediction information includes traffic congestion prediction information on traffic congestion in each time period of each day on the up lane of the highway between point B and point C (section B-1a, section B-2a, section B-3a, section B-4a, and section C, which will be described later), traffic congestion prediction information on traffic congestion in each time period of each day on the down lane of the highway between point C and point B (section B-4b, section B-3b, section B-2b, section B-1b, and section B, which will be described later), and the like. The traffic congestion prediction information is obtained periodically (e.g., every hour), for example, from the server of Japan Road Traffic Information Center, and the traffic congestion prediction information is updated as necessary. Thus, traffic information DB 101*b* includes the current traffic congestion prediction information on prediction of traffic congestion between points B and C.

Transportation plan DB 101*c* includes transportation plan information. The transportation plan information includes travel plan information for vehicle X, travel plan change information for vehicle X, travel route information indicating a travel route between point B and point C for vehicle X, travel plan information for vehicle Y, travel plan change information for vehicle Y, travel route information indicating a travel route between point C and point B for vehicle Y, driving plan information for first driver DA, driving plan change information for first driver DA, driving plan information for second driver DD, and driving plan change information for second driver DD.

The travel plan information for vehicle X includes scheduled point-A departure date and time information, point-B parking position information, scheduled point-B arrival date and time information, scheduled point-B departure date and time information, point-B-to-point-C travel speed information, point-C parking position information, scheduled point-C arrival date and time information, scheduled point-C departure date and time information, scheduled point-D arrival date and time information, and the like. Further, the transportation plan information for vehicle X includes driver information on first driver DA who drives vehicle X from point A to point B, driver information on second driver DD who drives vehicle X from point C to point D, unlocking key information for unlocking vehicle X, locking key information for locking vehicle X, and the like.

The travel plan change information for vehicle X includes changed scheduled point-A departure date and time information, changed point-B parking position information, changed scheduled point-B arrival date and time information, changed scheduled point-B departure date and time information, changed point-B-to-point-C travel speed information, changed point-C parking position information, changed scheduled point-C arrival date and time information, changed scheduled point-C departure date and time information, changed scheduled point-D arrival date and time information, nearest-smart-IC parking position information, scheduled nearest-smart-IC arrival information, scheduled nearest-smart-IC departure information, nearest-smart-IC-to-point-C travel speed information, changed driver information on first driver DA who drives vehicle X from point A to point B, changed driver information on second driver DD who drives vehicle X from point C to point D, and the like.

The travel plan information for vehicle Y includes scheduled point-D departure date and time information, point-C parking position information, scheduled point-C arrival date and time information, scheduled point-C departure date and time information, point-C-to-point-B travel speed information, point-B parking position information, scheduled point-B arrival date and time information, scheduled point-B departure date and time information, scheduled point-A arrival date and time information, and the like. Further, the transportation plan information for vehicle Y includes driver information on second driver DD who drives vehicle Y from point D to point C, driver information on first driver DA who drives vehicle Y from point B to point A, unlocking key information for unlocking vehicle Y, locking key information for locking vehicle Y, and the like.

The travel plan change information for vehicle Y includes changed scheduled point-D departure date and time information, changed point-C parking position information, changed scheduled point-C arrival date and time information, changed scheduled point-C departure date and time information, changed point-C-to-point-B travel speed information, changed point-B parking position information, changed scheduled point-B arrival date and time information, changed scheduled point-B departure date and time information, changed scheduled point-A arrival date and time information, nearest-smart-IC parking position information, scheduled nearest-smart-IC arrival information, scheduled nearest-smart-IC departure information, nearest-smart-IC-to-point-B travel speed information, changed driver information on second driver DD who drives vehicle Y from point C to point D, changed driver information on first driver DA who drives vehicle Y from point B to point A, and the like.

The driving plan information for first driver DA includes unlocking key information for unlocking vehicle X, locking key information for locking vehicle X, scheduled point-A departure information for vehicle X, scheduled point-B arrival date and time information for vehicle X, point-B parking position information for vehicle X, unlocking key information for unlocking vehicle Y, locking key information for locking vehicle Y, point-B parking position information for vehicle Y, scheduled point-B departure information for vehicle Y, scheduled point-A arrival date and time information for vehicle Y, and the like.

The driving plan change information for first driver DA includes changed unlocking key information for unlocking vehicle X, changed locking key information for locking vehicle X, changed scheduled point-A departure information for vehicle X, changed scheduled point-B arrival date and time information for vehicle X, changed point-B parking position information for vehicle X, changed unlocking key information for unlocking vehicle Y, changed locking key information for locking vehicle Y, changed point-B parking position information for vehicle Y, changed scheduled point-B departure information for vehicle Y, and changed scheduled point-A arrival date and time information for vehicle Y.

The driving plan information for second driver DD includes unlocking key information for unlocking vehicle Y, locking key information for locking vehicle Y, scheduled point-D departure information for vehicle Y, scheduled point-C arrival date and time information for vehicle Y, point-C parking position information for vehicle Y, unlocking key information for unlocking vehicle X, locking key information for locking vehicle X, point-C parking position information for vehicle X, scheduled point-C departure information for vehicle X, scheduled point-D arrival date and time information for vehicle X, and the like.

The driving plan change information for second driver DD includes changed unlocking key information for unlocking vehicle Y, changed locking key information for locking vehicle Y, changed scheduled point-D departure information for vehicle Y, changed scheduled point-C arrival date and time information for vehicle Y, changed point-C parking position information for vehicle Y, changed unlocking key information for unlocking vehicle X, changed locking key information for locking vehicle X, changed point-C parking position information for vehicle X, changed scheduled point-C departure information for vehicle X, and changed scheduled point-D arrival date and time information for vehicle X.

Control section 102 includes transportation plan preparation section 102a, transportation plan change section 102b, vehicle state management section 102c, and goods compartment condition management section 102d.

Transportation plan preparation section 102a executes a transportation plan preparation process for preparing the transportation plan information described above. Details of the transportation plan preparation process will be described later with reference to FIGS. 5 to 9.

Transportation plan change section 102b executes a transportation plan change process for changing the transportation plan information prepared by transportation plan preparation section 102a described above. Cases where the transportation plan information is changed by transportation plan change section 102b includes a case where an event requiring a change occurs between point B and point C (point C and point B) before vehicle X (vehicle Y) departs from point A (point D), a case where an event requiring a change occurs between point B and point C (point C and point B) while vehicle X (vehicle Y) is traveling from point A (point D) toward point D (point A), and other cases. When an event requiring a change occurs between point B and point C (point C and point B), transportation plan change section 102b changes the travel plan for vehicle X (vehicle Y). The changed travel plan is stored in transportation plan DB 101c as the travel plan change information. In addition, when an event requiring a change occurs between point B and point C (point C and point B), transportation plan change section 102b changes the driving plan for first driver DA (second driver DD). The changed driving plan is stored in transportation plan DB 101c as the driving plan change information.

Vehicle state management section 102c manages the current vehicle state of each of vehicles X and Y based on vehicle state information transmitted by in-vehicle system 200. In addition, based on the vehicle state information transmitted by in-vehicle system 200, vehicle state management section 102c manages whether or not a throttle control, a brake control, a steering control, and the like of the vehicle are in a good state. Further, based on the vehicle state information transmitted by in-vehicle system 200, vehicle state management section 102c manages whether or not drive control section 208 is in a good state. Therefore, items managed by vehicle state management section 102c are items such as the vehicle external condition, throttle control, brake control, steering control, and drive control. The vehicle state information, based on which the above items are managed, is transmitted based on a recognized condition recognized by vehicle state recognition section 209b of in-vehicle system 200. By receiving the vehicle state information, vehicle state management section 102c can grasp whether the current control state of each vehicle is a good state or a malfunctioning state (or anomalous state).

Goods compartment condition management section 102d manages the current condition in a goods compartment (the loaded state of goods) of vehicle X or Y based on goods compartment condition information transmitted by in-vehicle system 200. The goods compartment condition information, on which the above management is based, is transmitted based on the recognized condition recognized by vehicle state recognition section 209b of in-vehicle system 200. By receiving the goods compartment condition information, vehicle state management section 102c can grasp whether the vehicle is in a good state in which no collapse of goods has occurred or in a state in which collapse of the goods may have occurred (or in a state in which collapse of the goods has occurred) in each current goods compartment of each vehicle. When there is no anomaly in a goods compartment, in-vehicle system 200 transmits, as the goods compartment condition information, information indicating that there is no anomaly in the goods compartment, each captured image information, and an acceleration value of each acceleration sensor. On the other hand, when an anomaly has occurred in the goods compartment, or, when it is recognized that there is a possibility that an anomaly has occurred, information indicating that there is an anomaly in the goods compartment, information indicating an anomalous part, each captured image information, and the acceleration value of each of the acceleration sensors are transmitted as the goods compartment condition information. Goods compartment condition management section 102d receives such goods compartment condition information to grasp the condition in the goods compartment of each vehicle.

Communication control I/F section 103 conforms to various communication standards such as a Local Area Network (LAN) standard, and functions as an interface for communicating data with in-vehicle system 200 and driver terminal 300 via a communication line.

Input/output I/F section 104 functions as an interface for input of information to transportation management apparatus 100 and for output of information from transportation management apparatus 100. Operation section 105 and display section 106 are connected to input/output I/F section 104.

Operation section 105 is an information input device such as a keyboard and a mouse, and display section 106 is an information output device such as a display.

(In-Vehicle System)

In-vehicle system 200 is mounted in vehicle X (vehicle Y). In-vehicle system 200 includes Global Positioning System (GPS) reception section 201, navigation section 202, map information database (DB) 203, travel plan storage section 204, vehicle-external-condition detection section 205, goods compartment condition detection section 206, locking section 207, drive control section 208, driving control section 209, communication control I/F section 210, input/output I/F section 211, operation section 212, audio input/output section 213, and display section 214. Further, in-vehicle system 200 includes a driver-terminal attachment section (not illustrated) to which driver terminal 300 is attached.

GPS reception section 201 receives signals from a plurality of satellites to calculate the distance from the satellites to identify the latitude and longitude of vehicle X (vehicle Y) so as to measure the position of vehicle X (vehicle Y). Then, the measured position information is transmitted to driving control section 209.

Based on the position of vehicle X (vehicle Y) measured by GPS reception section 201 and the map information in map information DB 203, navigation section 202 sets a travel route from the current position of vehicle X (vehicle Y) to a destination to be arrived. Then, the set travel route information is transmitted to driving control section 209. Further, navigation section 202 sets the travel route for vehicle X (vehicle Y) in the unmanned autonomous travel section based on the travel plan information and the travel route information stored in travel plan storage section 204. Then, the set travel route information is transmitted to driving control section 209.

The map information is stored in map information DB 203. The map information includes various road information such as speed limit information, road type information, road width information, number-of-lanes information, tunnel information, elevation (sidewalk bridge, three-dimensional intersection, etc.) information, and the like in addition to road map information. The speed limit information is information indicating the speed limit in each section of each road. The road type information is information indicating the type of each road such as a highway, prefectural road, city road, and side road, the presence or absence of a right-turn lane and a left-turn lane, the presence or absence of an intersection and a turning point (road turn), the curvature of a curve, the inclination angle of the road, and the like. The road width information is information indicating the width of each road. The number-of-lanes information is information indicating the number of lanes on the road. The tunnel information is information indicating the distance of a tunnel and the height limit in the tunnel. The elevation information is information indicating the height limit of a pedestrian bridge or a three-dimensional intersection.

Travel plan storage section 204 stores the travel plan information on a travel plan prepared by transportation plan preparation section 102a described above, and the travel route information. In the case of vehicles X, the stored travel plan information includes the driver information for first driver DA who drives from point A to point B, the driver information for second driver DD who drives from point C to point D, the unlocking key information for unlocking vehicle X, the locking key information for locking vehicle X, the scheduled point-A departure date and time information, the scheduled point-B parking position information, the scheduled point-B arrival date and time information, the scheduled point-B departure date and time information, the point-B-to-point-C travel speed information, the point-C parking position information, the scheduled point-C arrival date and time information, the scheduled point-C departure date and time information, the scheduled point-D arrival date and time information, and the like. Further, in the case of vehicles Y, the stored travel plan information includes the driver information for second driver DD who drives from point D to point C, the driver information for first driver DA who drives from point B to point A, the unlocking key information for unlocking vehicle Y, the locking key information for locking vehicle Y, the scheduled point-D departure date and time information, the scheduled point-C parking position information, the scheduled point-C arrival date and time information, the scheduled point-C departure date and time information, the point-C-to-point-B travel speed information, the point-B parking position information, the scheduled point-B arrival date and time information, the scheduled point-B departure date and time information, the scheduled point-A arrival date and time information, and the like.

Vehicle-external-condition detection section 205 includes an image-capturing apparatus, a sensor, and the like, and transmits information indicating the external condition of vehicle X (vehicle Y) to driving control section 209. The image-capturing apparatus includes a front image-capturing apparatus for capturing an image of a front view from vehicle X (vehicle Y), a rear image-capturing apparatus for capturing an image of a rear view from vehicle X (vehicle Y), a right image-capturing apparatus for capturing an image of a right view from vehicle X (vehicle Y), and a left image-capturing apparatus for capturing an image of a left view from vehicle X (vehicle Y). The image-capturing apparatuses transmit the captured image information to driving control section 209. The sensor includes a Light Detection and Ranging (LiDAR) that emits a laser beam forward from vehicle X (vehicle Y) for object detection and for measuring the distance and direction to an object, a sonic sensor (ultrasonic sensor) for detecting an obstacle or the like at the corner for vehicle X (vehicle Y), and the like. The sensors transmit measured or detected information to driving control section 209.

Goods compartment condition detection section 206 includes an image-capturing apparatus, a sensor, and the like, and transmits information indicating the condition in the goods compartment of vehicle X (vehicle Y) to driving control section 209. The image-capturing apparatus includes a goods-compartment front image-capturing apparatus for capturing an image of the goods compartment from the front, and a goods-compartment rear image-capturing apparatus for capturing an image of the goods compartment from the rear. The image-capturing apparatuses transmit the captured image information to driving control section 209. The sensor includes a longitudinal-direction acceleration sensor for detecting the acceleration in the longitudinal direction of vehicle X (vehicle Y), a lateral-direction acceleration sensor for detecting the acceleration in the lateral direction of vehicle X (vehicle Y), and the like. The sensors transmit the detected acceleration information to driving control section 209.

Locking section 207 includes a locking mechanism, and locks a door of vehicle X (vehicle Y) and the goods compartment.

Drive control section 208 executes a drive control on vehicle X (vehicle Y). Drive control section 208 includes a throttle control section, a brake control section, a steering control section, a vehicle speed detection sensor, a yaw rate sensor, and the like. Drive control section 208 executes a throttle control by the throttle control section in response to a throttle control signal from driving control section 209. In addition, drive control section 208 executes a brake control by the brake control section in response to a brake control signal from driving control section 209. In addition, drive control section 208 executes a steering control on steering by the steering control section in response to a steering control signal from driving control section 209. The vehicle speed sensor detects the rotational speed of wheels. The yaw rate sensor detects the rotational angular velocity in the turning direction of vehicle X (vehicle Y). Drive control section 208 transmits the rotation speed information detected by the vehicle speed sensor and the yaw rate information detected by the yaw rate sensor to ECU 10.

Driving control section 209 includes current position recognition section 209a, vehicle state recognition section 209b, travel state recognition section 209c, travel control section 209d, and locking control section 209e.

Current position recognition section 209a recognizes the current position of vehicle X (vehicle Y) at a constant intervals (every one second) based on the current position information by GPS reception section 201 and the map information in map information DB 203. Then, the recognized current position information is transmitted to transportation management apparatus 100. When recognizing the current position to recognize that vehicle X (vehicle Y) has departed point A, current position recognition section 209a transmits the point-A departure date and time information to transportation management apparatus 100. In addition, when recognizing the current position to recognize that vehicle X (vehicle Y) has arrived at point B, current position recognition section 209a transmits the point-B parking position information and the point-B arrival date and time information to transportation management apparatus 100, and when recognizing that vehicle X (vehicle Y) has departed from point B, current position recognition section 209a transmits the point-B departure date and time information to transportation management apparatus 100. In addition, when recognizing the current position to recognize that vehicle X (vehicle Y) has arrived at point C, current position recognition section 209a transmits the point-C parking position information and the point-C arrival date and time information to transportation management apparatus 100, and when recognizing that vehicle X (vehicle Y) has departed from point C, current position recognition section 209a transmits the point-C departure date and time information to transportation management apparatus 100. In addition, when recognizing the current position to recognize that vehicle X (vehicle Y) has arrived at point D, current position recognition section 209a transmits the point-D arrival date and time information to transportation management apparatus 100, and when recognizing that vehicle X (vehicle Y) has departed from point D, current position recognition section 209a transmits the point-D departure date and time information to transportation management apparatus 100.

In addition, when recognizing the current position to recognize that vehicle X (vehicle Y) has passed point B1, current position recognition section 209a transmits point-B1 passage date and time information to transportation management apparatus 100, and when recognizing that vehicle X (vehicle Y) has departed from point B2, current position recognition section 209a transmits the point-B1 passage date and time information to transportation management apparatus 100. In addition, when recognizing the current position to recognize that vehicle X (vehicle Y) has passed point B3, current position recognition section 209a transmits point-B3 passage date and time information to transportation management apparatus 100, and when recognizing that vehicle X (vehicle Y) has passed point B4, current position recognition section 209a transmits the point-B4 passage date and time information to transportation management apparatus 100.

Vehicle state recognition section 209b recognizes the current vehicle external condition based on the information transmitted by vehicle-external-condition detection section 205 and recognizes the current goods compartment condition based on the information transmitted by goods compartment condition detection section 206. Further, vehicle state recognition section 209b transmits the recognized vehicle external condition as the vehicle state information to transportation management apparatus 100 and transmits the recognized goods compartment condition as the goods compartment condition information to transportation management apparatus 100. When recognizing that there is no anomaly outside the vehicle, vehicle state recognition section 209b transmits, as the vehicle state information to transportation management apparatus 100, information indicating that there is no anomaly outside the vehicle. On the other hand, when recognizing that an anomaly has occurred outside the vehicle, vehicle state recognition section 209b transmits, as the vehicle state information to transportation management apparatus 100, information indicating that the anomaly has occurred outside the vehicle and information indicating an anomalous part. Further, when recognizing that there is no anomaly in the goods compartment, vehicle state recognition section 209b transmits, as the goods compartment condition information to transportation management apparatus 100, information indicating that there is no anomaly in the goods compartment, each captured image information, and the acceleration value of each of the acceleration sensors. On the other hand, when recognizing that anomaly has occurred in the goods compartment or that an anomaly may have occurred, vehicle state recognition section 209b transmits, as the goods compartment condition information to transportation management apparatus 100, information indicating that there is an anomaly in the goods compartment, information indicating an anomalous part, and each captured image information, and the acceleration value of each of the acceleration sensors.

Further, vehicle state recognition section 209b recognizes whether the state of the drive control of vehicle X (vehicle Y) by drive control section 208 is in a good state or in a malfunctioning state (or anomalous state). Vehicle state recognition section 209b diagnoses whether or not the throttle control (acceleration/deceleration performance) in accordance with the throttle control signal from driving control section 209 is as set. In addition, vehicle state recognition section 209b diagnoses whether or not the brake control (effectiveness of the brake) in accordance with the brake control signal from driving control section 209 is as set. In addition, vehicle state recognition section 209b diagnoses whether or not the steering control on steering in accordance with the steering control signal from driving control section 209 (the rotation angle in accordance with the steering control signal) is as set. In addition, vehicle state recognition section 209b diagnoses whether or not anomalous noise is generated from drive control section 208 or the like. When vehicle state recognition section 209b recognizes based on these diagnosis results that the state of the drive control of vehicle X (vehicle Y) by drive control section 208 is in a good state, vehicle state recognition section 209b transmits, as the vehicle state information to transportation management apparatus 100, information indicating that vehicle X (vehicle Y) is a good state and control values for respective controls. On the other hand, when vehicle state recognition section 209b recognizes based these diagnosis results that the state of the drive control of vehicle X (vehicle Y) by drive control section 208 is a malfunctioning state (or an anomalous state), vehicle state recognition section 209b transmits, as the vehicle state information to transportation management apparatus 100, information indicating a malfunctioning part (or anomalous part) and control values of respective controls.

Travel state recognition section 209c recognizes the travel speed and direction of vehicle X (vehicle Y) based on the rotation speed information and the yaw rate information received from drive control section 208.

Travel control section 209d switches between a manned travel control and an unmanned autonomous driving control based on the recognition of the current position of vehicle X (vehicle Y) by current position recognition section 209a and executes the manned travel control or the unmanned autonomous driving control. In the manned travel control, the travel control is executed by outputting a travel control signal corresponding to a driving operation by the driver to drive control section 208. In the unmanned autonomous driving control, the autonomous travel control on an autonomous travel in the unmanned autonomous travel section is executed by outputting a travel control signal corresponding to the travel plan information and the travel route information stored in travel plan storage section 204 to drive control section 208.

Locking control section 209e outputs, to locking section 207, a locking signal for locking the locking mechanism and an unlocking signal for unlocking the locking mechanism. Locking control section 209e collates the unlocking key information transmitted by driver terminal 300 with the unlocking key information registered in locking control section 209e, and outputs the unlocking signal to locking section 207 when the two pieces of the unlocking key information match each other as a result of collation. On the other hand, when driver terminal 300 is away from vehicle X (vehicle Y) by a predetermined distance (e.g., 5 m) or when a locking request signal from driver terminal 300 is received, locking control section 209e outputs a locking signal to locking section 207.

Communication control I/F section 210 functions as an interface for communicating data with transportation management apparatus 100 and driver terminal 300 via a communication line.

Input/output I/F section 211 functions as an interface for input of information to driving control section 209 and for output of information from driving control section 209. Operation section 212, audio input/output section 213, and display section 214 are connected to input/output I/F section 211.

Operation section 212 is an information input device such as a keyboard and a touch screen including a touch panel, audio input/output section 213 is an information input/output device including a speaker and a microphone, and display section 214 is an information output device such as a display.

(Driver Terminal)

Driver terminal 300 is a terminal possessed by first driver DA (second driver DD). Note that, during driving of vehicle X (vehicle Y), the driver terminal is attached to the driver-terminal attachment section (not illustrated) provided in in-vehicle system 200. Driver terminal 300 includes GPS reception section 301, key information storage section 302, driving plan storage section 303, terminal control section 304, communication control I/F section 305, input/output I/F section 306, operation section 307, audio input/output section 308, and display section 309, in addition to so-called mobile phone functions.

GPS reception section 301 receives signals from a plurality of satellites to calculate the distances from the satellites to identify the latitude and longitude of driver terminal 300 so as to measure the position of driver terminal 300. Then, the measured position information is transmitted to terminal control section 304.

Key information storage section 302 stores unlocking key information for unlocking vehicle X, locking key information for locking vehicle X, unlocking key information for unlocking vehicle Y, and locking key information for locking vehicle Y transmitted by transportation management apparatus 100. Note that, each piece of key information stored in key information storage section 302 is deleted from key information storage section 302 by terminal control section 304 when terminal control section 304 receives deletion instruction information from transportation management apparatus 100.

Driving plan storage section 303 stores driving plan information prepared by transportation plan preparation section 102a described above. In the case of first driver DA, the stored driving plan information includes the vehicle number of vehicle X, the scheduled point-A departure date and time information for vehicle X, the point-B parking position information for vehicle X, the scheduled point-B arrival date and time information for vehicle X, the vehicle number of vehicle Y, the point-B parking position information for vehicle Y, the scheduled point-B departure date and time information for vehicle Y, the scheduled point-A arrival date and time information for vehicle Y, and the like. In the case of second driver DD, the stored driving plan information includes the vehicle number of vehicle Y, the scheduled point-D departure date and time information for vehicle Y, the point-C parking position information for vehicle Y, the scheduled point-C arrival date and time information for vehicle Y, the vehicle number of vehicle X, the point-C parking position information for vehicle X, the scheduled point-C departure date and time information for vehicle X, the scheduled point-D arrival date and time information for vehicle X, and the like.

Terminal control section 304 includes locking/unlocking instruction section 304a and driving plan execution section 304b.

Locking/unlocking instruction section 304a transmits the unlocking key information for vehicle X or the locking key information for vehicle X stored in key information storage section 302 to in-vehicle system 200 of vehicle X in response to the operation of first driver DA (second driver DD), thereby instructing driving control section 209 of in-vehicle system 200 to unlock or lock vehicle X. In addition, locking/unlocking instruction section 304a transmits the unlocking key information for vehicle Y or the locking key information for vehicle Y stored in key information storage section 302 to in-vehicle system 200 of vehicle Y in response to the operation of first driver DA (second driver DD), thereby instructing driving control section 209 of in-vehicle system 200 to unlock or lock vehicle Y.

Based on the driving plan information stored in driving plan storage section 303 and the positional information on the position of driver terminal 300 from GPS reception section 301, driving plan execution section 304b causes display section 309 to display an action to be executed by first driver DA (second driver DD).

For example, driver terminal 300 possessed by first driver DA displays the following. When first driver DA is at point A, the vehicle number of vehicle X and the scheduled point-A departure date and time information for vehicle X are displayed on display section 309. Further, when first driver DA drives vehicle X from point A toward point B, the point-B parking position information for vehicle X and the scheduled point-B arrival date and time information for vehicle X are displayed on display section 309. When first driver DA arrives at point B and is scheduled to drive vehicle Y next, the vehicle number of vehicle Y, the point-B parking position information for vehicle Y, the scheduled point-B arrival date and time information for vehicle Y, and the scheduled point-B departure date and time information for vehicle Y are displayed on display section 309. On the other hand, when first driver DA arrives at point B and is not scheduled to drive vehicle Y next, a method for returning to point A is displayed on display section 309. Further, when first driver DA drives vehicle Y from point B toward point A, the scheduled point-A arrival date and time information for vehicle Y is displayed on display section 309.

In addition, driver terminal 300 possessed by second driver DD displays, for example, the following. When second driver DD is at point D, the vehicle number of vehicle Y and the scheduled point-D departure date and time information for vehicle Y are displayed on display section 309. Further, when second driver DD drives vehicle Y from point D toward point C, the point-C parking position information for vehicle Y and the scheduled point-C arrival date and time information for vehicle Y are displayed on display section 309. When second driver DD arrives at point C and is scheduled to drive vehicle X next, the vehicle number of vehicle X, the point-C parking position information for vehicle X, the scheduled point-C arrival date and time information for vehicle X, and the scheduled point-C departure date and time information for vehicle X are displayed on display section 309. On the other hand, when second driver DD arrives at point C and is not scheduled to drive vehicle X next, a method for returning to point D is displayed on display section 309. Further, when second driver DD drives vehicle X from point C toward point D, the scheduled point-D arrival date and time information for vehicle X is displayed on display section 309.

Communication control I/F section 305 functions as an interface for communicating data with transportation management apparatus 100 and in-vehicle system 200 via a communication line.

Input/output I/F section 306 functions as an interface for input of information to terminal control section 304 and for output of information from terminal control section 304. Operation section 307, audio input/output section 308, and display section 309 are connected to input/output I/F section 306.

Operation section 307 is an information input device such as a keyboard and a touch screen including a touch panel, audio input/output section 308 is an information input/output device including a speaker and a microphone, and display section 309 is an information output device such as a display.

(Transportation Status of Vehicle X)

Next, the transportation status of each vehicle X managed by transportation management apparatus 100 will be described with reference to FIG. 3.

Figure 3:
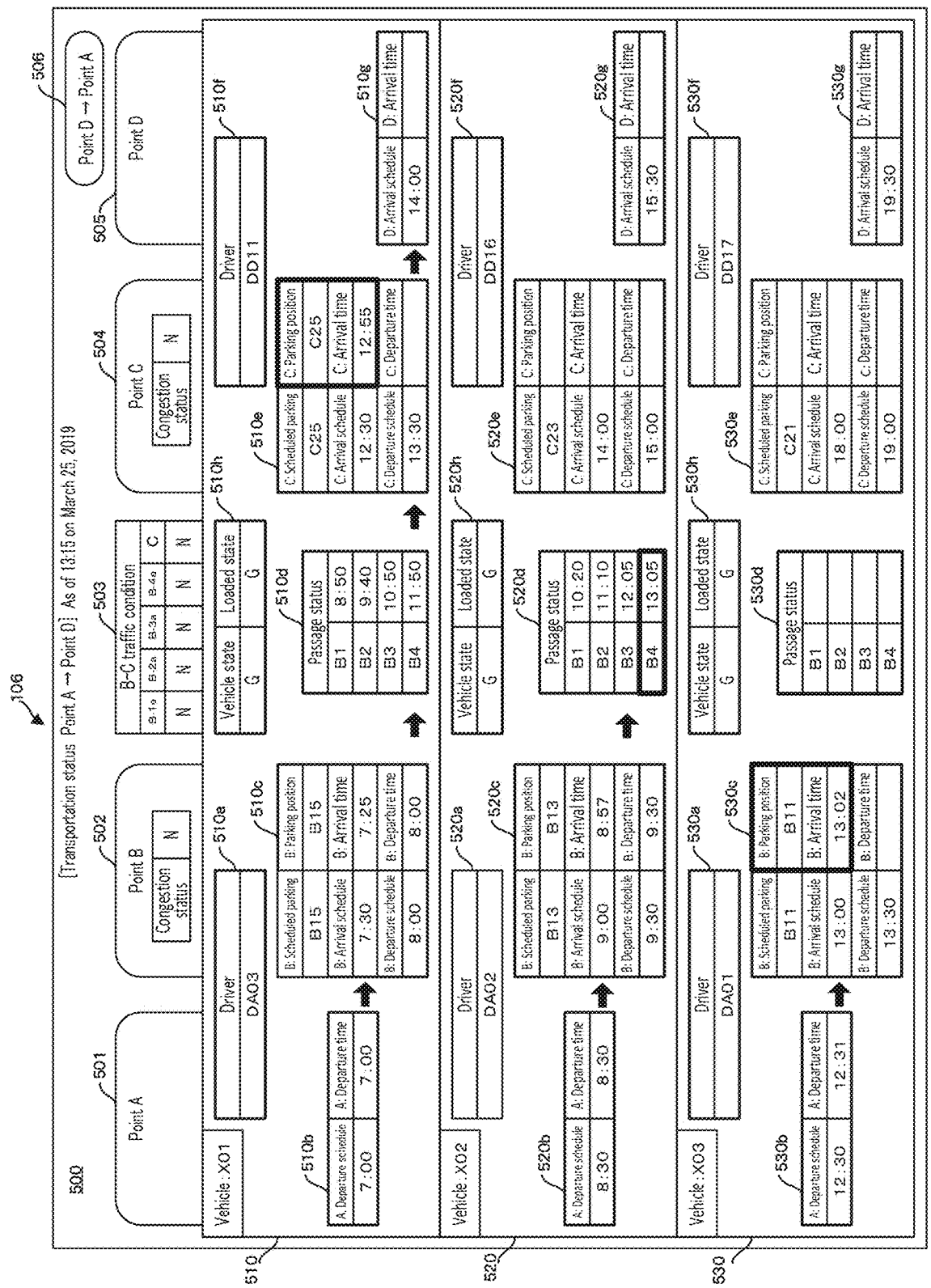
FIG. 3 illustrates a transportation status of transportation from point A to point D managed by a transportation management apparatus.

FIG. 3 is first transportation status management screen 500 displayed on display section 106 of transportation management apparatus 100. By referring to first transportation status management screen 500, an operator can check a travel history and a current status of each vehicle X traveling from point A toward point D.

Information about point A is displayed at point-A information display section 501. Information about point B is displayed at point-B information display section 502. Note that since point B is the smart IC on the highway, the congestion status at the smart IC is displayed. Regarding indications of the congestion status, "N" indicates that there is no congestion, "S" indicates that there is slight congestion, and "Y" indicates that there is congestion.

A current traffic condition at each passing point from point B to point C is displayed at B-C traffic condition display section 503. Here, the passing point is, for example, an interchange, a parking area, a service area, or the like existing between point B and point C. The character "B-1a" indicates a section between point B and point B1, section "B-2a" indicates a section between point B1 and point B2, section "B-3a" indicates a section between point B2 and point B3, section "B-4a" indicates a section between point B3 and point B4, and section "C" indicates a section between point B4 and point C. Regarding indications of traffic conditions, "N" indicates that there is no traffic congestion or congestion, "S" indicates that there is traffic congestion of less than 5 km, "L" indicates traffic congestion of 5 km or longer, and "Y" indicates that an accident has occurred.

Information about point C is displayed at point-C information display section 504. Note that since point C is the smart IC on the highway, the congestion status at the smart IC is displayed. Regarding indications of the congestion status, "N" indicates that there is no congestion, "S" indicates that there is slight congestion, and "Y" indicates that there is congestion. Information about point D is displayed at point-D information display section 505. Point-D-to-point-A switching display section 506 is a button to be clicked by mouse operation by the operator to switch the display to second transportation status management screen 600.

The reference numeral "510" denotes a transportation status display section for vehicle X01. The driver information on first driver DA who drives vehicle X01 from point A to point B is displayed at first driver information display section 510*a*.

The date and time of scheduled departure of vehicle X01 from point A and the date and time of departure of vehicle X01 from point A are displayed at point-A departure information display section 510*b*. The date and time of scheduled departure of vehicle X01 from point A are displayed based on the travel plan information for vehicle X01 stored in travel plan storage section 204. Further, the date and time of departure of vehicle X01 from point A are displayed when transportation management apparatus 100 receives the point-A departure date and time information transmitted by in-vehicle system 200 of vehicle X01.

A scheduled parking position of vehicle X01 at point B, a parking position of vehicle X01 at point B, a date and time of scheduled arrival of vehicle X01 at point B, a date and time of arrival of vehicle X01 at point B, a date and time of scheduled departure of vehicle X01 from point B, and a date and time of departure of vehicle X01 from point B are displayed at point-B arrival/departure information display section 510*c*. The scheduled parking position of vehicle X01 at point B, the date and time of scheduled arrival of vehicle X01 at point B, and the date and time of scheduled departure of vehicle X01 from point B are displayed based on the travel plan information for vehicle X01 stored in travel plan storage section 204. Further, the parking position of vehicle X01 at point B, the date and time of arrival of vehicle X01 at point B, and the date and time of departure of vehicle X01 from point B are displayed when transportation management apparatus 100 receives the point-B parking position information, the point-B arrival date and time information, and the point-B departure date and time information transmitted by in-vehicle system 200 of vehicle X01.

The passage date and time when vehicle X01 passes point B1, the passage date and time when vehicle X01 passes point B2, the passage date and time when vehicle X01 passes point B3, and the passage date and time when vehicle X01 passes point B4 are displayed at unmanned autonomous travel section passage status display section 510*d*. These passage dates and times are displayed when transportation management apparatus 100 receives the passage date and time information on passage through each point transmitted by in-vehicle system 200 of vehicle X01.

A scheduled parking position of vehicle X01 at point C, a parking position of vehicle X01 at point C, a date and time of scheduled arrival of vehicle X01 at point C, a date and time of arrival of vehicle X01 at point C, a date and time of scheduled departure of vehicle X01 from point C, and a date and time of departure of vehicle X01 from point C are displayed at point-C arrival/departure information display section 510*e*. The scheduled parking position of vehicle X01 at point C, the date and time of scheduled arrival of vehicle X01 at point C, and the date and time of scheduled departure of vehicle X01 from point C are displayed based on the travel plan information for vehicle X01 stored in travel plan storage section 204. Further, the parking position of vehicle X01 at point C, the date and time of arrival of vehicle X01 at point C, and the date and time of departure of vehicle X01 from point C are displayed when transportation management apparatus 100 receives the point-C parking position information, the point-C arrival date and time information, and the point-C departure date and time information transmitted by in-vehicle system 200 of vehicle X01.

The driver information on second driver DD who drives vehicle X01 from point C to point D is displayed at second driver information display section 510*f*.

The date and time of scheduled arrival of vehicle X01 at point D and the date and time of arrival of vehicle X01 at point D are displayed at point-D departure information display section 510*g*. The date and time of scheduled arrival of vehicle X01 at point D are displayed based on the travel plan information for vehicle X01 stored in travel plan storage section 204. Further, the date and time of arrival of vehicle X01 at point D are displayed when transportation management apparatus 100 receives the point-D arrival date and time information transmitted by in-vehicle system 200 of vehicle X01.

The vehicle state of vehicle X01 and the loaded state of vehicle X01 are displayed at state display section 510*h*. Regarding indications of the vehicle state, "G" indicates a good state, "M" indicates a malfunctioning state, and "X" indicates an anomalous state. In addition, regarding indications of the loaded state, "G" indicates no problem, "M" indicates a possibility of collapse, and "X" indicates collapse.

Pieces of information are displayed at each display section of transportation status display section 520 for vehicle X02 and transportation status display section 530 for vehicle X03 in the same manner as in transportation status display section 510 for vehicle X01 described above.

Note that, portions of first transportation status management screen 500 which are displayed with a thick frame illustrate the progresses of travel of respective vehicles X as of the current date and time. Thus, it can be seen that vehicle X01 arrived at parking position C25 at point C at 12:55. Further, it can be seen that vehicle X02 passed point B4 at 13:05 and is traveling toward point C. Further, it can be seen that vehicle X03 arrived at parking position B11 at point B at 13:02.

(Transportation Status of Vehicle Y)

Next, the transportation status of each vehicle Y managed by transportation management apparatus 100 will be described with reference to FIG. 4.

Figure 4:
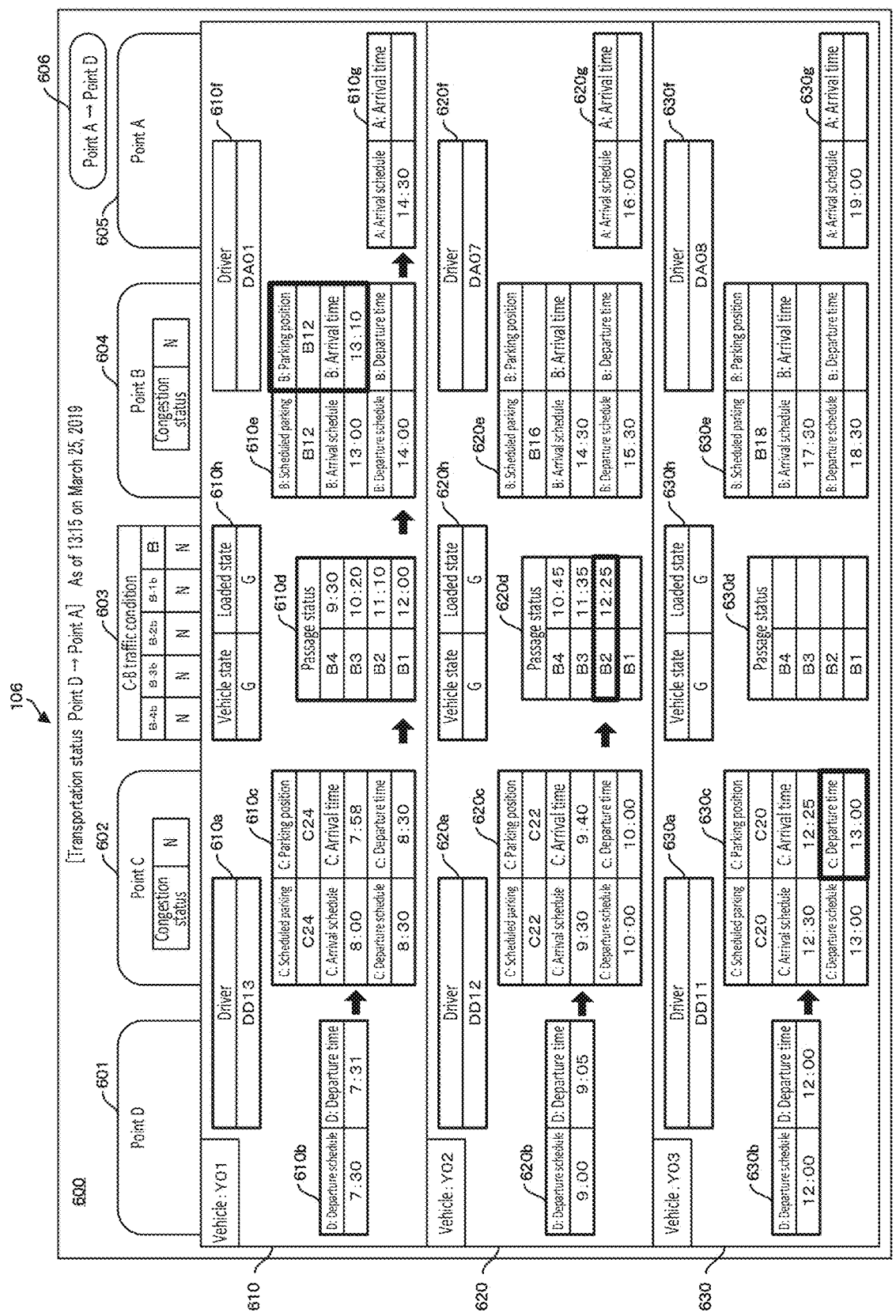
FIG. 4 illustrates a transportation status of transportation from point D to point A managed by the transportation management apparatus.

FIG. 4 is second transportation status management screen 600 displayed on display section 106 of transportation management apparatus 100. By referring to second transportation status management screen 600, an operator can check a travel history and a current status of each vehicle Y traveling from point D toward point A.

Information about point D is displayed at point-D information display section 601. Information about point C is displayed at point-C information display section 602. Note that since point C is the smart IC on the highway, the congestion status at the smart IC is displayed. Regarding indications of the congestion status, "N" indicates that there is no congestion, "S" indicates that there is slight congestion, and "Y" indicates that there is congestion.

A current traffic condition at each passing point from point C to point B is displayed at C-B traffic condition display section 603. Here, the passing point is, for example, an interchange, a parking area, a service area, or the like existing between point C and point B. Section "B-4b" indicates a section between point C and point B4, section "B-3b" indicates a section between point B4 and point B3, section "B-2b" indicates a section between point B3 and point B2, section "B-1b" indicates a section between point B2 and point B1, and section "B" indicates a section between point B1 and point B. Regarding indications of traffic conditions, "N" indicates that there is no traffic congestion or congestion, "S" indicates that there is traffic congestion of less than 5 km, "L" indicates traffic congestion of 5 km or longer, and "Y" indicates that an accident has occurred.

Information about point B is displayed at point-B information display section 604. Note that since point B is the smart IC on the highway, the congestion status at the smart IC is displayed. Regarding indications of the congestion status, "N" indicates that there is no congestion, "S" indicates that there is slight congestion, and "Y" indicates that there is congestion. Information about point A is displayed at point-A information display section 605. Point-A-to-point-D switching display section 606 is a button to be clicked by mouse operation by the operator to switch the display to first transportation status management screen 500.

The reference numeral "610" denotes a transportation status display section for vehicle Y01. The driver information on second driver DD who drives vehicle Y01 from point D to point C is displayed at second driver information display section 610*a*.

The date and time of scheduled departure of vehicle Y01 from point D and the date and time of departure of vehicle Y01 from point D are displayed at point-D departure information display section 610*b*. The date and time of scheduled departure of vehicle Y01 from point D are displayed based on the travel plan information for vehicle Y01 stored in travel plan storage section 204. Further, the date and time of departure of vehicle Y01 from point D are displayed when transportation management apparatus 100 receives the point-D departure date and time information transmitted by in-vehicle system 200 of vehicle Y01.

A scheduled parking position of vehicle Y01 at point C, a parking position of vehicle Y01 at position C, a date and time of scheduled arrival of vehicle Y01 at point C, a date and time of arrival of vehicle Y01 at point C, a date and time of scheduled departure of vehicle Y01 from point C, and a date and time of departure of vehicle Y01 from point C are displayed at point-C arrival/departure information display section 610c. The scheduled parking position of vehicle Y01 at point C, the date and time of scheduled arrival of vehicle Y01 at point C, and the date and time of scheduled departure of vehicle Y01 from point C are displayed based on the travel plan information for vehicle Y01 stored in travel plan storage section 204. Further, the parking position of vehicle Y01 at position C, the date and time of arrival of vehicle Y01 at point C, and the date and time of departure of vehicle Y01 from point C are displayed when transportation management apparatus 100 receives the point-C parking position information, the point-C arrival date and time information, and the point-C departure date and time information transmitted by in-vehicle system 200 of vehicle Y01.

The passage date and time when vehicle Y01 passes point B4, the passage date and time when vehicle Y01 passes point B3, the passage date and time when vehicle Y01 passes point B2, and the passage date and time when vehicle Y01 passes point B1 are displayed at unmanned autonomous travel section passage status display section 610d. These passage dates and times are displayed when transportation management apparatus 100 receives the passage date and time information on passage through each point transmitted by in-vehicle system 200 of vehicle Y01.

A scheduled parking position of vehicle Y01 at point B, a parking position of vehicle Y01 at position B, a date and time of scheduled arrival of vehicle Y01 at point B, a date and time of arrival of vehicle Y01 at point B, a date and time of scheduled departure of vehicle Y01 from point B, and a date and time of departure of vehicle Y01 from point B are displayed at point-B arrival/departure information display section 610e. The scheduled parking position of vehicle Y01 at point B, the date and time of scheduled arrival of vehicle Y01 at point B, and the date and time of scheduled departure of vehicle Y01 from point B are displayed based on the travel plan information for vehicle Y01 stored in travel plan storage section 204. Further, the parking position of vehicle Y01 at position B, the date and time of arrival of vehicle Y01 at point B, and the date and time of departure of vehicle Y01 from point B are displayed when transportation management apparatus 100 receives the point-B parking position information, the point-B arrival date and time information, and the point-B departure date and time information transmitted by in-vehicle system 200 of vehicle Y01.

The driver information on first driver DA who drives vehicle Y01 from point B to point A is displayed at first driver information display section 610f.

The date and time of scheduled arrival of vehicle Y01 at point A and the date and time of arrival of vehicle Y01 at point A are displayed at point-A departure information display section 610g. The date and time of scheduled arrival of vehicle Y01 at point A are displayed based on the travel plan information for vehicle Y01 stored in travel plan storage section 204. Further, the date and time of arrival of vehicle Y01 at point A are displayed when transportation management apparatus 100 receives the point-A arrival date and time information transmitted by in-vehicle system 200 of vehicle Y01.

The vehicle state of vehicle Y01 and the loaded state of vehicle Y01 are displayed at state display section 610h. Regarding indications of the vehicle state, "G" indicates a good state, "M" indicates a malfunctioning state, and "X" indicates an anomalous state. In addition, regarding indications of the loaded state, "G" indicates no problem, "M" indicates a possibility of collapse, and "X" indicates collapse.

Pieces of information are displayed at each display section of transportation status display section 620 for vehicle Y02 and transportation status display section 630 for vehicle Y03 in the same manner as in transportation status display section 610 for vehicle Y01 described above.

Note that, portions of second transportation status management screen 600 which are displayed with a thick frame illustrate the progresses of travel of respective vehicles Y as of the current date and time. Thus, it can be seen that vehicle Y01 arrived at parking position B12 at point B at 13:10. Further, it can be seen that vehicle Y02 passed point B2 at 12:25 and is traveling toward point B1. Further, it can be seen that vehicle Y03 departed point C at 13:00.

(Transportation Plan Preparation Process)

Next, the transportation plan preparation process executed by transportation plan preparation section 102a will be described with reference to FIGS. 5 to 9.

Figure 5:
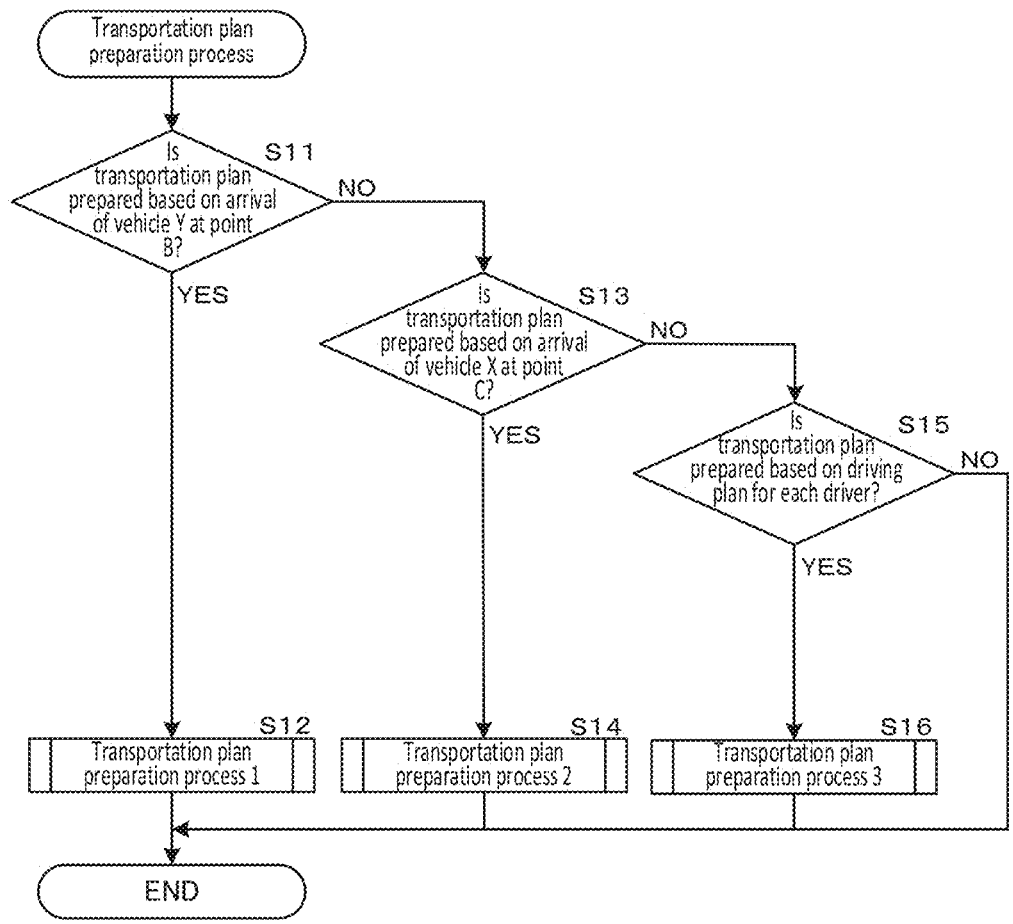
FIG. 5 is a flowchart illustrating a transportation plan preparation process performed by a transportation plan preparation section.
Figure 6:
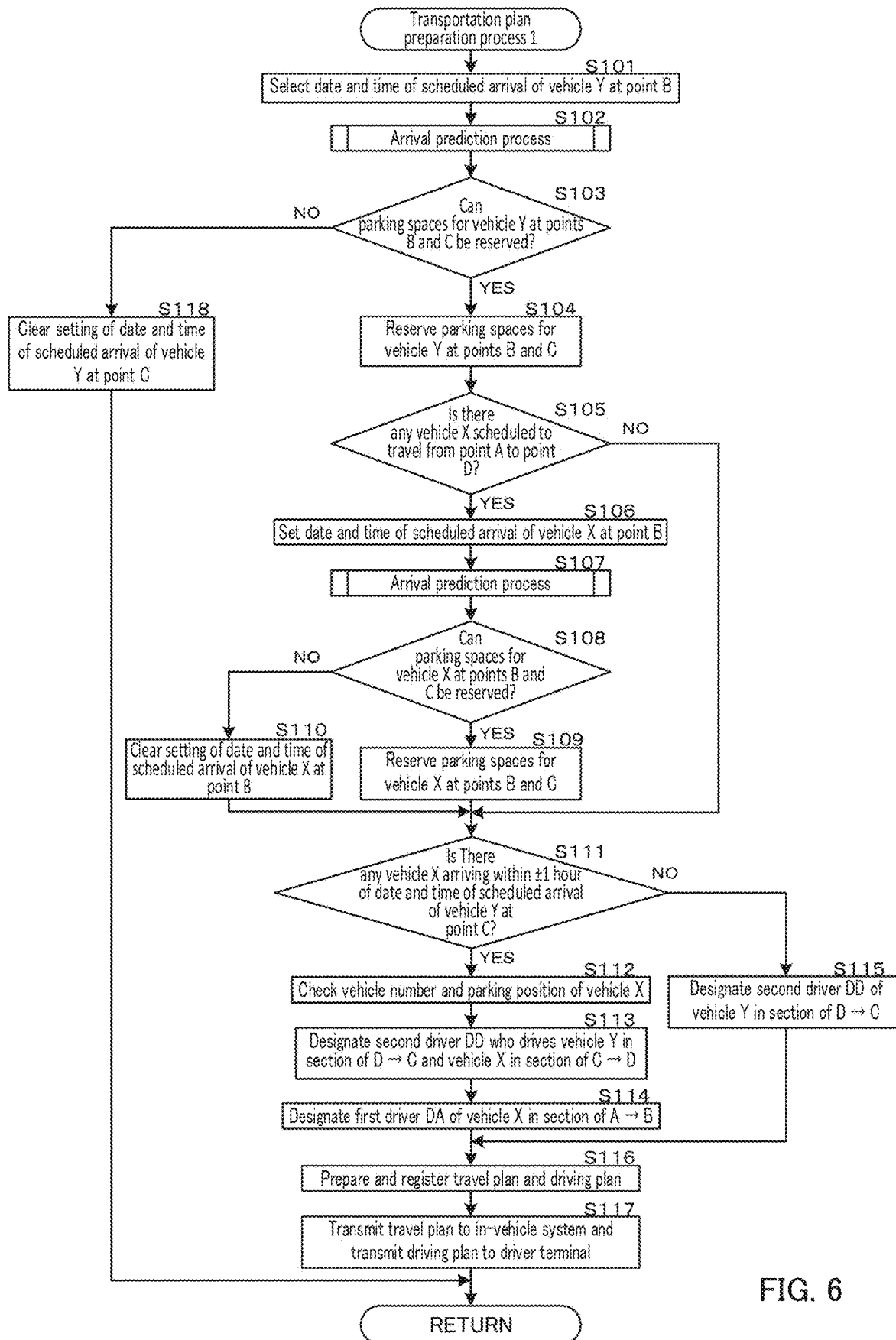
FIG. 6 is a flowchart illustrating transportation plan preparation process 1 in the transportation plan preparation process.
Figure 7:
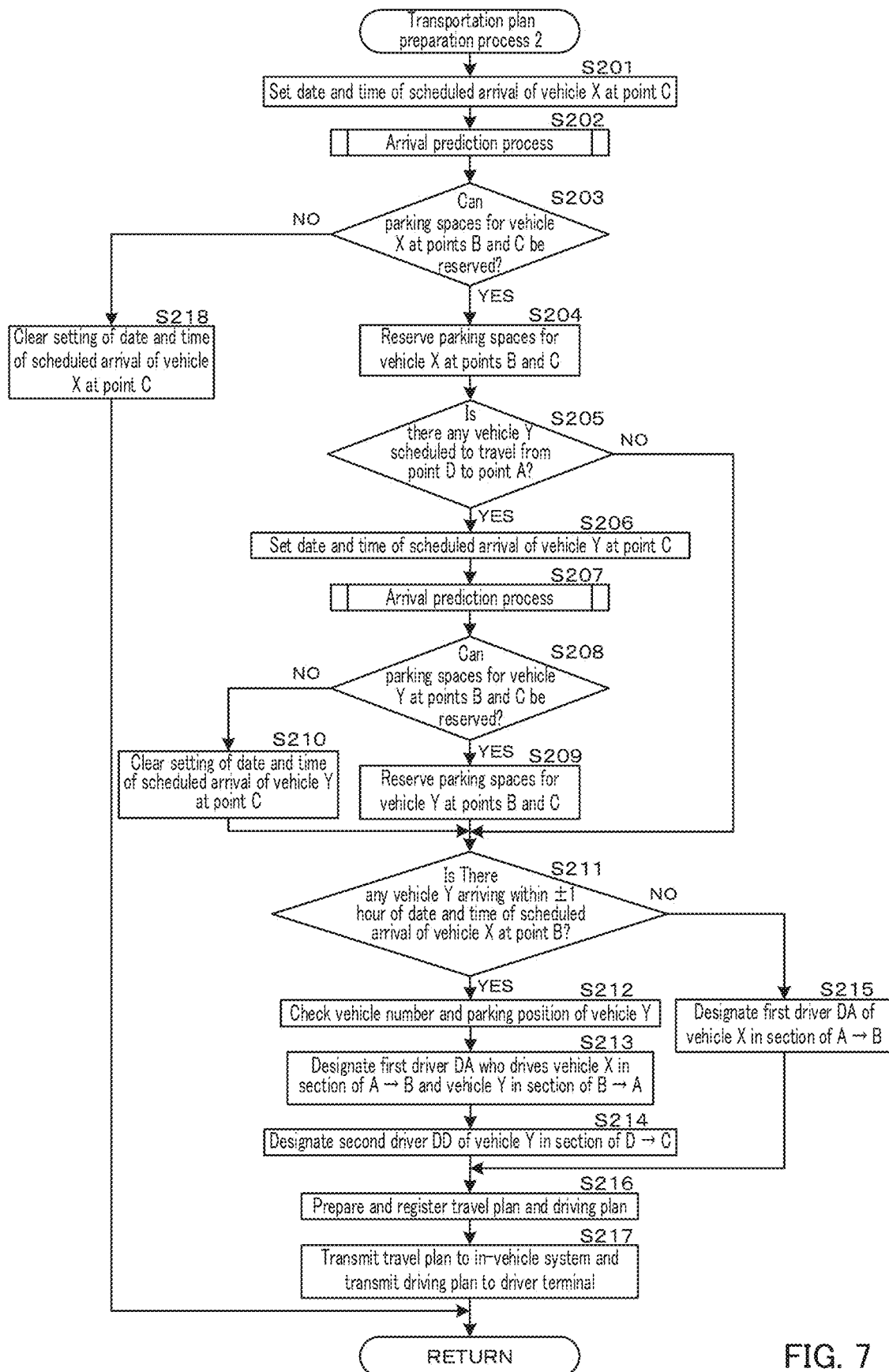
FIG. 7 is a flowchart illustrating transportation plan preparation process 2 in the transportation plan preparation process.
Figure 8:
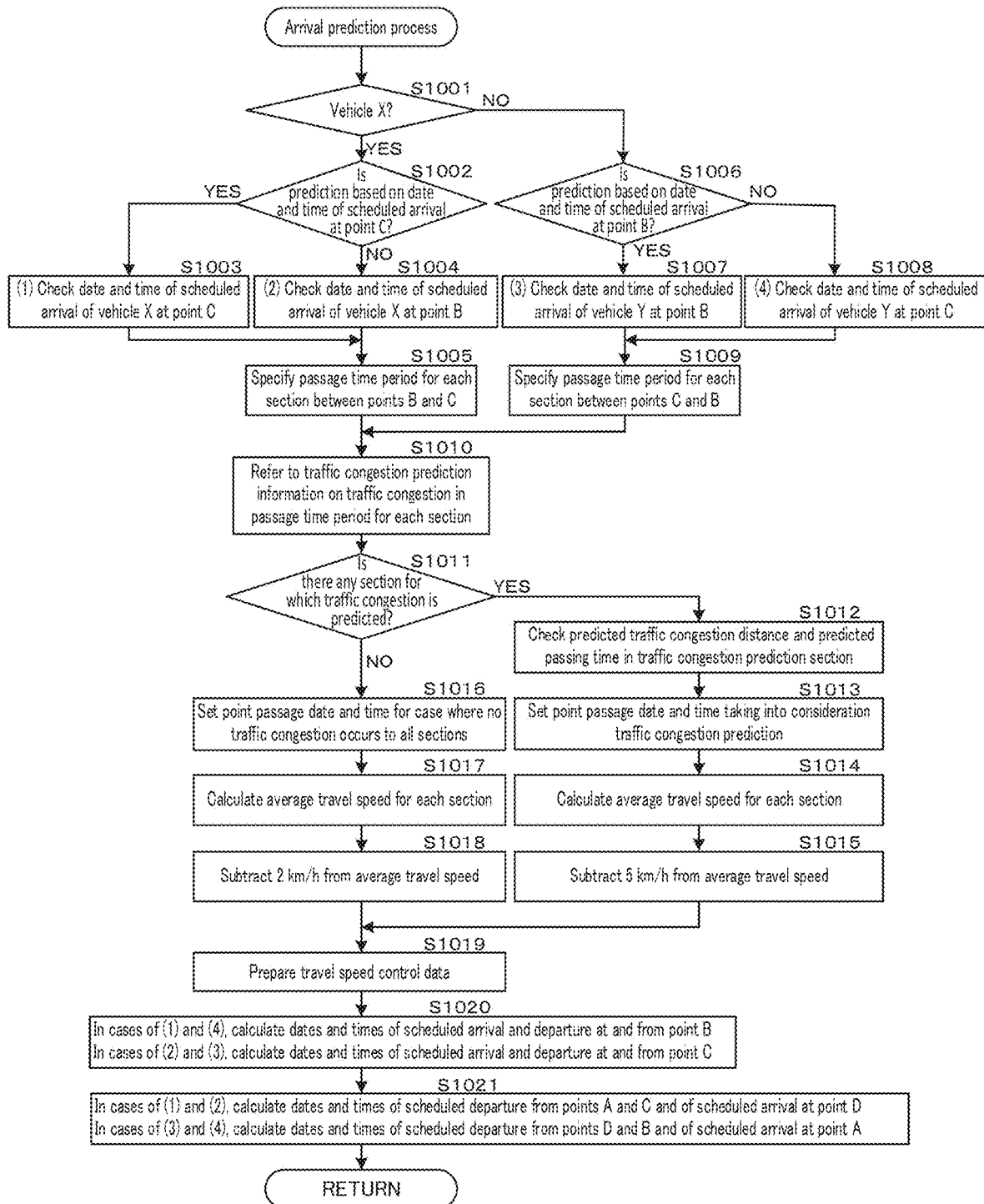
FIG. 8 is a flowchart illustrating an arrival prediction process.
Figure 9:
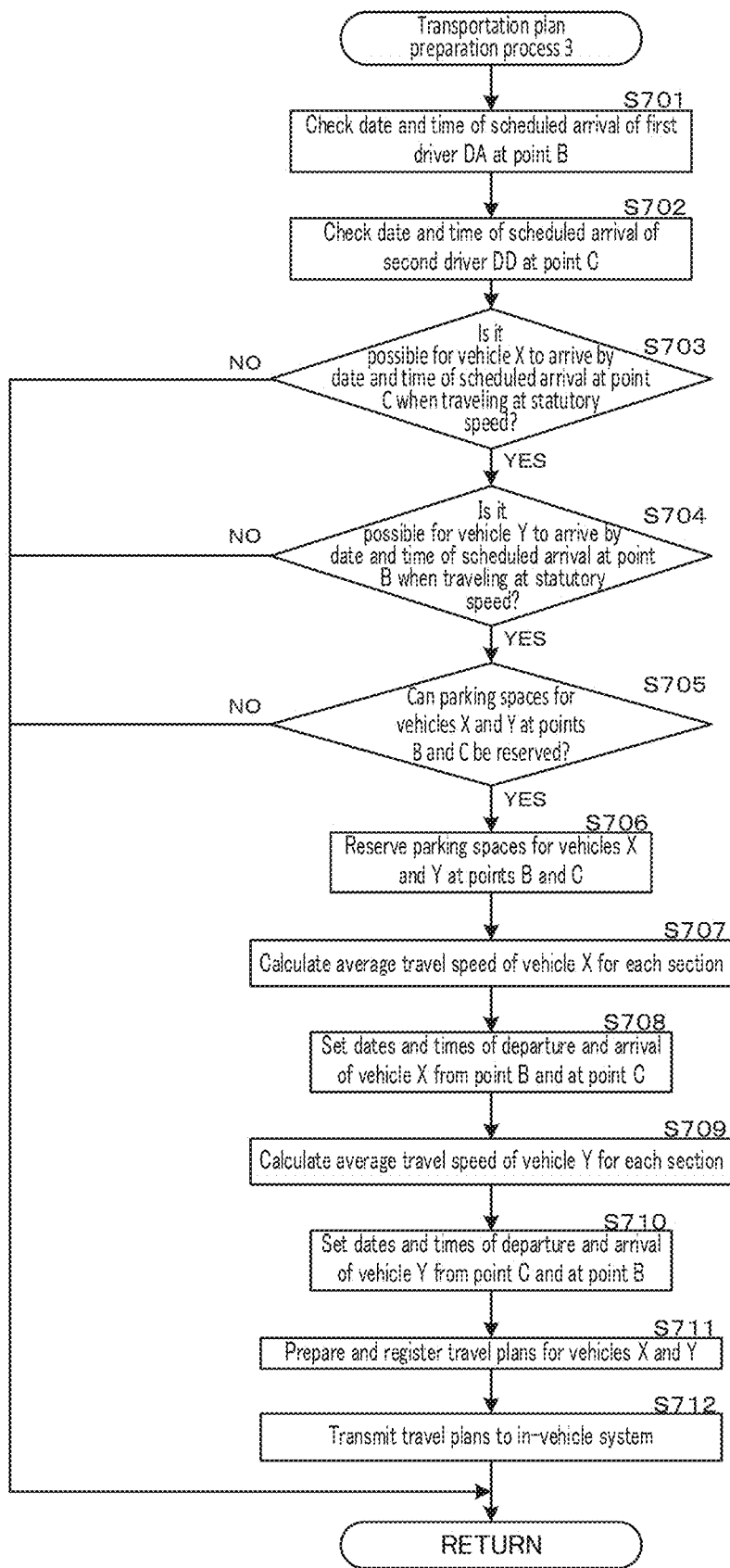
FIG. 9 is a flowchart illustrating transportation plan preparation process 3 in the transportation plan preparation process.

FIG. 5 is a flowchart illustrating a transportation plan preparation process executed by transportation plan preparation section 102a. FIG. 6 is a flowchart illustrating transportation plan preparation process 1 in the transportation plan preparation process. FIG. 7 is a flowchart illustrating transportation plan preparation process 2 in the transportation plan preparation process. FIG. 8 is a flowchart illustrating an arrival prediction process in transportation plan preparation process 1 and transportation plan preparation process 2. FIG. 9 is a flowchart illustrating transportation plan preparation process 3 in the transportation plan preparation process.

To begin with, in step S11, transportation plan preparation section 102a judges whether or not to prepare a transportation plan based on arrival of vehicle Y at point B. When it is judged that the transportation plan is to be prepared based on the arrival of vehicle Y at point B, the process proceeds to step S12. On the other hand, when it is judged that the transportation plan is not to be prepared based on the arrival of point B of vehicle Y, the process proceeds to Step S13.

When it is judged that the transportation plan is to be prepared based on the arrival of vehicle Y at point B, transportation plan preparation section 102a executes transportation plan preparation process 1 in step S12.

When it is judged that the transportation plan is not to be prepared based on the arrival of vehicle Y at point B, transportation plan preparation section 102a judges in step S13 whether or not the transportation plan is to be prepared in accordance with arrival of vehicle X at point C. When it is judged that the transportation plan is to be prepared in accordance with the arrival of vehicle X at point C, the process proceeds to step S14. On the other hand, when it is judged that the transportation plan is not to be prepared in accordance with the arrival at point C of vehicle X, the process proceeds to step S15.

When it is judged that the transportation plan is not to be prepared based on the arrival of vehicle X at point C, transportation plan preparation section 102a judges in step S15 whether or not the transportation plan is to be prepared based on the driving plans for drivers DA and DD. When it is judged that the transportation plan is to be prepared based on the driving plans for drivers DA and DD, the process proceeds to step S16. On the other hand, when it is judged that the transportation plan is not to be prepared based on the driving plans for drivers DA and DD, the transportation plan preparation process ends.

(Transportation Plan Preparation Process 1)

Next, transportation plan preparation process 1 will be described with reference to FIG. 6.

To begin with, in step S101, transportation plan preparation section 102a selects the date and time of scheduled arrival of vehicle Y at point B.

Next, in step S102, transportation plan preparation section 102a executes an arrival prediction process. Here, the arrival prediction process will be described with reference to FIG. 8.

In step S1001, transportation plan preparation section 102a judges whether or not vehicle X is a target for arrival prediction. When the target for arrival prediction is vehicle X, the process proceeds to step S1002. On the other hand, when the target for arrival prediction is not vehicle X, the process proceeds to step S1006.

Next, in step S1002, transportation plan preparation section 102a judges whether or not to perform prediction based on the date and time of scheduled arrival of vehicle X at point C. When it is judged that the prediction is to be performed based on the date and time of scheduled arrival of vehicle X at point C, the process proceeds to step S1003. On the other hand, when it is judged that the prediction is not to be performed based on the date and time of scheduled arrival of vehicle X at point C, it is judged that the prediction is to be performed based on the date and time of scheduled arrival of vehicle X at point B, and the process proceeds to step S1004.

When it is judged that the prediction is to be performed based on the date and time of scheduled arrival of vehicle X at point C, transportation plan preparation section 102a checks the date and time of scheduled arrival of vehicle X at point C in step S1003. Note that, the process of "checking the date and time of scheduled arrival of vehicle X at point C" is referred to as process (1).

On the other hand, when it is judged that the prediction is to be performed based on the date and time of scheduled arrival of vehicle X at point B, transportation plan preparation section 102a checks the date and time of scheduled arrival of vehicle X at point B in step S1004. The process of "checking the date and time of scheduled arrival of vehicle X at point B" is referred to as process (2).

Subsequently, in step S1005, when the process of step S1005 is executed following the process of step S1003, transportation plan preparation section 102a performs back calculation based on the date and time of scheduled arrival of vehicle X at point C to specify a passage time period in which vehicle X passes each of the sections (section B-1a, section B-2a, section B-3a, section B-4a, and section C) between points B and C. Meanwhile, in step S1005, when the process of step S1005 is executed following the process of step S1004, transportation plan preparation section 102a specifies, based on the date and time of scheduled arrival of vehicle X at point B, the passage time period in which vehicle X passes each of the sections (section B-1a, section B-2a, section B-3a, section B-4a, and section C) between points B and C.

In step S1001, when the target for arrival prediction is not vehicle X, transportation plan preparation section 102a identifies the target for arrival prediction as vehicle Y. Then, in step S1006, transportation plan preparation section 102a judges whether or not the prediction is to be performed based on the date and time of scheduled arrival of vehicle Y at point B. When it is judged that the prediction is to be performed based on the date and time of scheduled arrival of vehicle Y at point B, the process proceeds to step S1007. On the other hand, when it is judged that the prediction is not to be performed based on the date and time of scheduled arrival of vehicle Y at point B, it is judged that the prediction is to be performed based on the date and time of scheduled arrival of vehicle Y at point C, and the process proceeds to step S1008.

When it is judged that the prediction is to be performed based on the date and time of scheduled arrival of vehicle Y at point B, transportation plan preparation section 102a checks the date and time of scheduled arrival of vehicle Y at point B in step S1007. The process of "checking the date and time of scheduled arrival of vehicle Y at point B" is referred to as process (3).

On the other hand, when it is judged that the prediction is to be performed based on the date and time of scheduled arrival of vehicle Y at point C, transportation plan preparation section 102a checks the date and time of scheduled arrival of vehicle Y at point C in step S1008. Note that, the process of "checking the date and time of scheduled arrival of vehicle Y at point C" is referred to as process (4).

Subsequently, in step S1009, when the process of step S1009 is executed following the process of step S1007, transportation plan preparation section 102a performs back calculation based on the date and time of scheduled arrival of vehicle Y at point B, to specify a passage time period in which vehicle Y passes each of the sections (section B-4b, section B-3b, section B-2b, section B-1b, and section B) between points C and B. Meanwhile, in step S1009, when the process of step S1009 is executed following the process of step S1008, transportation plan preparation section 102a specifies, based on the date and time of scheduled arrival of vehicle Y at point C, the passage time period in which vehicle Y passes each of the sections (section B-4b, section B-3b, section B-2b, section B-1b, and section B) between points C and B.

Subsequently, in step S1010, transportation plan preparation section 102a refers to traffic congestion prediction information on prediction of traffic congestion in the passage time period for each of the sections as stored in traffic information DB 101b. In this step S1010, in the case of vehicle X (in the case where above-described processes (1) and (2) are executed), transportation plan preparation section 102a refers to the traffic congestion prediction information on prediction of traffic congestion in the passage time period for each of the sections (section B-1a, section B-2a, section B-3a, section B-4a, and section C) between point B and point C. On the other hand, in this step S1010, in the case of vehicle Y (in the case where above-described processes (3) and (4) are executed), transportation plan preparation section 102a refers to the traffic congestion prediction information on prediction of traffic congestion in the passage time period for each of the sections (section B-4b, section B-3b, section B-2b, section B-1b, and section B) between point C and point B.

Subsequently, in step S1011, transportation plan preparation section 102a judges whether or not the referred traffic congestion prediction information indicates any section for which traffic congestion is predicted. When it is judged that the referred traffic congestion prediction information indicates a section for which traffic congestion is predicted, the process proceeds to step S1012. On the other hand, when it is judged that the referred traffic congestion prediction information does not indicates any section for which traffic congestion is predicted, the process proceeds to step S1016.

When it is judged that there is a section for which traffic congestion is predicted, transportation plan preparation section 102a checks a predicted traffic congestion distance and predicted passing time in the traffic congestion prediction section in step S1012.

Subsequently, in step S1013, transportation plan preparation section 102a sets point passage dates and times taking into consideration the checked traffic congestion prediction. Here, by way of example, transportation plan preparation section 102a assumes that traffic congestion of 5 km is predicted in section B-1a (between points B and B1), the section distance of which is 45 km, and which can be passed in 30 minutes by traveling at an average speed of 75 km/h when there is no traffic congestion, and that it takes 20 minutes to pass through the congested part of the section. In such a case, transportation plan preparation section 102a estimates that the time taken to pass through the traffic congestion is a total of 30 minutes of the passage time of 20 minutes for passing through the congested part+a surplus time of 10 minutes. In addition, the remaining section of 40 km is estimated to be traveled at an average speed of 75 km/h in 32 minutes. Then, the time taken to pass point B1 is set to 62 minutes (average speed of 43.5 km) for setting the passage date and time.

Subsequently, in step S1014, transportation plan preparation section 102a calculates average travel speeds for respective sections. Here, in the case of vehicle X, transportation plan preparation section 102a calculates the average speeds for the respective sections (section B-1a, section B-2a, section B-3a, section B-4a, and section C) between point B and point C. In addition, in the case of vehicle Y, transportation plan preparation section 102a calculates the average speeds for the respective sections (section B-4b, section B-3b, section B-2b, section B-1b, and section B) between point C and point B.

Subsequently, in step S1015, by subtracting 5 km/h from the average speeds for the respective sections calculated in step S1014, transportation plan preparation section 102a corrects a deviation that would be caused, for example, in a case where an actual congestion distance is longer than the predicted traffic congestion distance.

When it is judged in step S1011 that there is no section for which traffic congestion is predicted, transportation plan preparation section 102a, in step S1016, sets to all the sections the point passage date and time for the case where no traffic congestion occurs.

Subsequently, in step S1017, transportation plan preparation section 102a calculates the average travel speeds for the respective sections. Here, in the case of vehicle X, transportation plan preparation section 102a calculates the average speeds for the respective sections (section B-1a, section B-2a, section B-3a, section B-4a, and section C) between point B and point C. In addition, in the case of vehicle Y, transportation plan preparation section 102a calculates the average speeds for the respective sections (section B-4b, section B-3b, section B-2b, section B-1b, and section B) between point C and point B.

Subsequently, in step S1018, by subtracting 2 km/h from the average speeds for the respective sections calculated in step S1017, transportation plan preparation section 102a corrects a deviation that would be caused, for example, during an actual travel (in a case of occurrence of congestion or the like).

Next, in step S1019, transportation plan preparation section 102a prepares travel speed control data. Here, in the case of vehicle X, transportation plan preparation section 102a calculates, for example, an average speed of 75 km/h for section B-1a, an average speed of 78 km/h for section B-2a, an average speed of 78 km/h for section B-3a, an average speed of 78 km/h for section B-4a, and an average speed of 73 km/h for section C between point B and point C. Note that the processes of from step S1012 to step S1015 or the processes of from step S1016 to step S1018 may not be executed. That is, in the stage of preparing a travel plan, only the arrival dates and times are set, while the travel speed do not have to be set. In this case, it is also conceivable that vehicle X (vehicle Y) adjusts the speed at according to its own determination (depending on the presence or absence of traffic congestion, road condition, etc.) according to the arrival dates and times.

Subsequently, when process (1) (process of step S1003) or process (4) (process of step S1008) has been performed, transportation plan preparation section 102a calculates the date and time of scheduled arrival at point B and the date and time of scheduled departure from point B in step S1020.

That is, the speed control data for speeds between point B and point C is prepared based on the date and time of scheduled arrival of vehicle X at point C, and the date and time of scheduled arrival of vehicle X at point B and the date and time of scheduled departure of vehicle X from point B are calculated based on the prepared speed control data. Note that, the date and time of scheduled departure of vehicle X from point B is set to, for example, time 30 minutes after the date and time of scheduled arrival of vehicle X at point B.

Further, the speed control data for speeds between point C and point B is prepared based on the date and time of scheduled arrival of vehicle Y at point C, and the date and time of scheduled arrival of vehicle Y at point B and the date and time of scheduled departure of vehicle Y from point B are calculated based on the prepared speed control data. Note that, the date and time of scheduled departure of vehicle Y from point B is set to, for example, time 60 minutes after the date and time of scheduled arrival of vehicle Y at point B.

Further, when process (2) (the process of step S1004) or process (3) (the process of step S1007) has been performed, transportation plan preparation section 102a calculates the date and time of scheduled arrival at point C and the date and time of scheduled departure from point C in step S1020.

That is, the speed control data for speeds between point B and point C is prepared based on the date and time of scheduled arrival of vehicle X at point B, and the date and time of scheduled arrival of vehicle X at point C and the date and time of scheduled departure of vehicle X from point C are calculated based on the prepared speed control data. Note that, the date and time of scheduled departure of vehicle X from point C is set to, for example, time 60 minutes after the date and time of scheduled arrival of vehicle X at point C.

Further, the speed control data for speeds between point C and point B is prepared based on the date and time of scheduled arrival of vehicle Y at point C, and the date and time of scheduled arrival of vehicle Y at point C and the date and time of scheduled departure of vehicle Y from point C are calculated based on the prepared speed control data. Note that, the date and time of scheduled departure of vehicle Y from point C is set to, for example, time 30 minutes after the date and time of scheduled arrival of vehicle Y at point C.

Subsequently, when process (1) (the process of step S1003) or process (2) (the process of step S1004) has been performed, transportation plan preparation section 102a calculates the date and time of scheduled departure of vehicle X from point A, the date and time of scheduled departure of vehicle X from point C, and the date and time of scheduled arrival of vehicle X at point D in step S1021.

Thus, when the process is based on process (1) (the process of step S1003), the date and time of scheduled arrival of vehicle X at point B is calculated from the set date and time of scheduled arrival of vehicle X at point C, the date and time of scheduled departure of vehicle X from point A is calculated from the calculated date and time of scheduled arrival of vehicle X at point B, the date and time of scheduled departure of vehicle X from point C is calculated from the set date and time of scheduled arrival of vehicle X at point C, and the date and time of scheduled arrival of vehicle X at point D is calculated from the calculated date and time of scheduled departure of vehicle X from point C.

In addition, when the process is based on process (2) (the process of step S1004), the date and time of scheduled arrival of vehicle X at point C is calculated from the set date and time of scheduled arrival of vehicle X at point B, the date and time of scheduled departure of vehicle X from point C is calculated from the calculated date and time of scheduled arrival of vehicle X at point C, the date and time of scheduled departure of vehicle X from point A is calculated from the set date and time of scheduled arrival of vehicle X at point B, and the date and time of scheduled arrival of vehicle X at point D is calculated from the calculated date and time of scheduled departure of vehicle X from point C.

Further, when process (3) (the process of step S1007) or process (4) (the process of step S1008) has been performed, transportation plan preparation section 102a calculates the date and time of departure of vehicle Y from point D, the date and time of departure of vehicle Y from point B, and the date and time of scheduled arrival of vehicle Y at point A in step S1021.

Thus, when the process is based on process (3) (the process of step S1007), the date and time of scheduled arrival of vehicle Y at point C is calculated from the set date and time of scheduled arrival of vehicle Y at point B, the date and time of scheduled departure of vehicle Y from point D is calculated from the calculated date and time of scheduled arrival of vehicle Y at point C, the date and time of scheduled departure of vehicle Y from point B is calculated from the set date and time of scheduled arrival of vehicle Y at point B, and the date and time of scheduled arrival of vehicle X at point A is calculated from the calculated date and time of scheduled departure of vehicle Y from point B.

In addition, when the process is based on process (4) (the process of step S1008), the date and time of scheduled arrival of vehicle Y at point B is calculated from the set date and time of scheduled arrival of vehicle Y at point C, the date and time of scheduled departure of vehicle Y from point B is calculated from the calculated date and time of scheduled arrival of vehicle Y at point B, the date and time of scheduled departure of vehicle Y from point D is calculated from the set date and time of scheduled arrival of vehicle Y at point C, and the date and time of scheduled arrival of vehicle Y at point A is calculated from the calculated date and time of scheduled departure of vehicle Y from point B.

When the arrival prediction process is executed in step S102, transportation plan preparation section 102a judges in step S103 whether or not a parking space at point B and a parking space at point C for parking of vehicle Y can be reserved. Judgement of whether or not the parking spaces can be reserved is performed by checking reservation statuses on the respective parking lot reservation websites of the smart IC operating companies. When it is judged that the parking space at point B and the parking space at point C for parking of vehicle Y can be reserved, the process proceeds to step S104. On the other hand, when it is judged that the parking space at point B and the parking space at point C for parking of vehicle Y cannot be reserved, the process proceeds to step S118.

When it is judged that the parking space at point B and the parking space at point C for parking of vehicle Y can be reserved, transportation plan preparation section 102a reserves the parking space at point B and the parking space at point C for parking of vehicle Y in step S104. Here, transportation plan preparation section 102a reserves the parking spaces on the respective parking lot reservation websites of the smart IC operating companies. Note that, when the parking space at point B is reserved, the reservation is for the time with an estimated surplus time (for example, the date and time of scheduled departure from point B+2 hours) taking into consideration the date and time of scheduled arrival of vehicle Y at point B, the date and time of scheduled departure from point B, and a delay in arrival at point B that would be caused due to traffic congestion. Further, when the parking space at point C is reserved, the reservation is for the time taking into consideration the date and time of scheduled arrival of vehicle Y at point C and the date and time of scheduled departure of vehicle Y from point C.

On the other hand, when it is judged that the parking space at point B and the parking space at point C for parking of vehicle Y cannot be reserved, transportation plan preparation section 102a clears the setting of the date and time of scheduled arrival of vehicle Y at point C in step S118, and ends this transportation plan preparation process 1.

Next, in step S105, transportation plan preparation section 102a judges whether or not there is any vehicle X scheduled to travel from point A to point D. When it is judged that there is vehicle X scheduled to travel from point A to point D, the process proceeds to step S106. On the other hand, when it is judged that there is no vehicle X scheduled to travel from point A to point D, the process proceeds to step S111.

Next, in step S106, transportation plan preparation section 102a sets the date and time of scheduled arrival of vehicle X at point B scheduled to travel from point A to point D. Here, transportation plan preparation section 102a sets the date and time of scheduled arrival of vehicle X at point B in accordance with the date and time of scheduled arrival of vehicle Y at point B.

Next, in step S107, transportation plan preparation section 102a executes the arrival prediction process. The arrival prediction process is as described above.

Subsequently, in step S108, transportation plan preparation section 102a judges whether or not the parking space at point B and the parking space at point C for parking of vehicle X can be reserved. Judgement of whether or not the parking spaces can be reserved is performed by checking reservation statuses on the respective parking lot reservation websites of the smart IC operating companies. When it is judged that the parking space at point B and the parking space at point C for parking of vehicle X can be reserved, the process proceeds to step S109. On the other hand, when it is judged that the parking space at point B and the parking space at point C for parking of vehicle X cannot be reserved, the process proceeds to step S110.

When it is judged that the parking space at point B and the parking space at point C for parking of vehicle X can be reserved, transportation plan preparation section 102a reserves the parking space at point B and the parking space at point C for parking of vehicle X in step S109. Here, transportation plan preparation section 102a reserves the parking spaces on the respective parking lot reservation websites of the smart IC operating companies. Note that, when the parking space at point B is reserved, the reservation is for the time taking into consideration the date and time of scheduled arrival of vehicle X at point B and the date and time of scheduled departure of vehicle X from point B. Further, when the parking space at point C is reserved, the reservation is for the time with an estimated surplus time (for example, the date and time of scheduled departure from point C+2 hours) taking into consideration the date and time of scheduled arrival of vehicle X at point C, the date and time of scheduled departure from point C, and a delay in arrival at point C that would be caused due to traffic congestion.

On the other hand, when it is judged that the parking space at point B and the parking space at point C for parking of vehicle X cannot be reserved, transportation plan preparation section 102a clears the setting of the date and time of scheduled arrival of vehicle X at point B in step S110.

Next, in step S111, transportation plan preparation section 102a judges whether or not there is any vehicle X scheduled to arrive at point C within ±1 hour of the date and time of scheduled arrival of vehicle Y at point C. When it is judged that there is vehicle X scheduled to arrive at point C within ±1 hour of the date and time of scheduled arrival of vehicle Y at point C, the process proceeds to step S112. On the other hand, when it is judged that there is no vehicle X scheduled to arrive at point C within ±1 hour of the date and time of scheduled arrival of vehicle Y at point C, the process proceeds to step S115. Note that the processes after step S112 may be performed without executing the process of step S111.

When it is judged that there is vehicle X scheduled to arrive at point C within ±1 hour of the date and time of scheduled arrival of vehicle Y at point C, transportation plan preparation section 102a checks the vehicle number of vehicle X scheduled to arrive at point C and the parking position at point C for vehicle X in step S112.

Subsequently, in step S113, transportation plan preparation section 102a designates second driver DD who drives vehicle Y from point D to point C and drives vehicle X to return from point C to point D.

Subsequently, in step S114, transportation plan preparation section 102a designates first driver DA who drives vehicle X from point A to point B.

When it is judged that there is no vehicle X scheduled to arrive at point C within ±1 hour of the date and time of scheduled arrival of vehicle Y at point C, transportation plan preparation section 102a designates, in step S115, second driver DD who drives vehicle Y from point D to point C.

Subsequently, in step S116, transportation plan preparation section 102a prepares a travel plan and a driving plan, and registers the prepared travel plan and driving plan in transportation plan DB 101c.

Subsequently, in step S117, transportation plan preparation section 102a transmits the travel plan registered in transportation plan DB 101c to in-vehicle system 200 of vehicle X and in-vehicle system 200 of vehicle Y, which are the targets of the travel plan. In addition, transportation plan preparation section 102a transmits the driving plan registered in transportation plan DB 101c to driver terminal 300 possessed by first driver DA and driver terminal 300 possessed by second driver DD, which are the targets of the driving plan. After the process of step S117 is executed, transportation plan preparation process 1 ends. Each of in-vehicle system 200 of vehicle X and in-vehicle system 200 of and vehicle Y receiving the travel plan information stores the travel plan information in travel plan storage section 204. Then, travel control section 209d causes vehicle X (vehicle Y) to travel in accordance with the travel plan information stored in travel plan storage section 204. Each of driver terminals 300 receiving the driving plan information stores the received driving plan information in driving plan storage section 303. Then, according to the driving plan information stored in driving plan storage section 303, first driver DA (second driver DD) drives vehicle X (vehicle Y).

(Transportation Plan Preparation Process 2)

Next, transportation plan preparation process 2 will be described with reference to FIG. 7.

To begin with, in step S201, transportation plan preparation section 102a selects the date and time of scheduled arrival of vehicle X at point C.

Next, in step S202, transportation plan preparation section 102a executes an arrival prediction process. The arrival prediction process is as described above.

When the arrival prediction process is executed in step S202, transportation plan preparation section 102a judges whether or not a parking space at point B and a parking space at point C for parking of vehicle X can be reserved in step S203. Judgement of whether or not the parking spaces can be reserved is performed by checking reservation statuses on the respective parking lot reservation websites of the smart IC operating companies. When it is judged that the parking space at point B and the parking space at point C for parking of vehicle X can be reserved, the process proceeds to step S204. On the other hand, when it is judged that the parking space at point B and the parking space at point C for parking of vehicle X cannot be reserved, the process proceeds to step S218.

When it is judged that the parking space at point B and the parking space at point C for parking of vehicle X can be reserved, transportation plan preparation section 102a reserves the parking space at point B and the parking space at point C for parking of vehicle X in step S204. Here, transportation plan preparation section 102a reserves the parking spaces on the respective parking lot reservation websites of the smart IC operating companies. Note that, when the parking space at point B is reserved, the reservation is for the time taking into consideration the date and time of scheduled arrival of vehicle X at point B and the date and time of scheduled departure of vehicle X from point B. Further, when the parking space at point C is reserved, the reservation is for the time with an estimated surplus time (for example, the date and time of scheduled departure from point C+2 hours) taking into consideration the date and time of scheduled arrival of vehicle X at point C, the date and time of scheduled departure from point C, and a delay in arrival at point C that would be caused due to traffic congestion.

On the other hand, when it is judged that the parking space at point B and the parking space at point C for parking of vehicle X cannot be reserved, transportation plan preparation section 102a clears the setting of the date and time of scheduled arrival of vehicle X at point C in step S218, and ends this transportation plan preparation process 2.

Next, in step S205, transportation plan preparation section 102a judges whether or not there is any vehicle Y scheduled to travel from point D to point A. When it is judged that there is vehicle Y scheduled to travel from point D to point A, the process proceeds to step S206. On the other hand, when it is judged that there is no vehicle Y scheduled to travel from point D to point A, the process proceeds step S211.

Next, in step S206, transportation plan preparation section 102a sets the date and time of scheduled arrival of vehicle Y at point C scheduled to travel from point D to point A.

Here, transportation plan preparation section 102a sets the date and time of scheduled arrival of vehicle Y at point C in accordance with the date and time of scheduled arrival of vehicle X at point C.

Next, in step S207, transportation plan preparation section 102a executes an arrival prediction process. The arrival prediction process is as described above.

Subsequently, in step S208, transportation plan preparation section 102a judges whether or not the parking space at point B and the parking space at point C for parking of vehicle Y can be reserved. Judgement of whether or not the parking spaces can be reserved is performed by checking reservation statuses on the respective parking lot reservation websites of the smart IC operating companies. When it is judged that the parking space at point B and the parking space at point C for parking of vehicle Y can be reserved, the process proceeds to step S209. On the other hand, when it is judged that the parking space at point B and the parking space at point C for parking of vehicle Y cannot be reserved, the process proceeds to step S210.

When it is judged that the parking space at point B and the parking space at point C for parking of vehicle Y can be reserved, transportation plan preparation section 102a reserves the parking space at point B and the parking space at point C for parking of vehicle Y in step S209. Here, transportation plan preparation section 102a reserves the parking spaces on the respective parking lot reservation websites of the smart IC operating companies. Note that, when the parking space at point B is reserved, the reservation is for the time with an estimated surplus time (for example, the date and time of scheduled departure from point B+2 hours) taking into consideration the date and time of scheduled arrival of vehicle Y at point B, the date and time of scheduled departure from point B, and a delay in arrival at point B that would be caused due to traffic congestion. Further, when the parking space at point C is reserved, the reservation is for the time taking into consideration the date and time of scheduled arrival of vehicle Y at point C and the date and time of scheduled departure of vehicle Y from point C.

On the other hand, when it is judged that the parking space at point B and the parking space at point C for parking of vehicle Y cannot be reserved, transportation plan preparation section 102a clears the setting of the date and time of scheduled arrival of vehicle Y at point C in step S210.

Next, in step S211, transportation plan preparation section 102a judges whether or not there is any vehicle Y scheduled to arrive at point B within ±1 hour of the date and time of scheduled arrival of vehicle X at point B. When it is judged that there is vehicle Y scheduled to arrive at point B within ±1 hour of the date and time of scheduled arrival of vehicle X at point B, the process proceeds to step S212. On the other hand, when it is judged that there is no vehicle Y scheduled to arrive at point B within ±1 hour of the date and time of scheduled arrival of vehicle X at point B, the process proceeds to step S215. Note that the processes after step S212 may be performed without executing the process of step S211.

When it is judged that there is vehicle Y scheduled to arrive at point B within ±1 hour of the date and time of scheduled arrival of vehicle X at point B, transportation plan preparation section 102a checks the vehicle number of vehicle Y scheduled to arrive at point B and the parking position at point B for vehicle Y in step S212.

Subsequently, in step S213, transportation plan preparation section 102a designates Ath driver DA who drives vehicle X from point A to point B and drives vehicle Y to return from point B to point A.

Subsequently, in step S214, transportation plan preparation section 102a designates second driver DD who drives vehicle Y from point D to point C.

When it is judged that there is no vehicle Y scheduled to arrive at point B within ±1 hour of the date and time of scheduled arrival of vehicle X at point B, transportation plan preparation section 102a designates, in step S215, first driver DA who drives vehicle X from point A to point B Subsequently, in step S216, transportation plan preparation section 102a prepares travel plan information and driving plan information, and registers the prepared travel plan information and driving plan information in transportation plan DB 101c.

Subsequently, in step S217, transportation plan preparation section 102a transmits the travel plan information registered in transportation plan DB 101c to in-vehicle system 200 of vehicle X and in-vehicle system 200 of vehicle Y, which are targets of the travel plan. In addition, transportation plan preparation section 102a transmits the driving plan information registered in transportation plan DB 101c to driver terminal 300 possessed by first driver DA and driver terminal 300 possessed by second driver DD, which are targets of the driving plan. After the process of step S217 is executed, transportation plan preparation process 2 ends. Each of in-vehicle system 200 of vehicle X and in-vehicle system 200 of and vehicle Y receiving the travel plan information stores the travel plan information in travel plan storage section 204. Then, travel control section 209d causes vehicle X (vehicle Y) to travel in accordance with the travel plan information stored in travel plan storage section 204. Each of driver terminals 300 receiving the driving plan information stores the received driving plan information in driving plan storage section 303. Then, according to the driving plan information stored in driving plan storage section 303, first driver DA (second driver DD) drives vehicle X (vehicle Y).

(Transportation Plan Preparation Process 3)

Next, transportation plan preparation process 3 will be described with reference to FIG. 9.

To begin with, in step S701, transportation plan preparation section 102a checks a date and time of scheduled arrival of first driver DA at point B. Here, transportation plan preparation section 102a checks driving plan information for first driver DA registered in transportation plan DB 101c. Note that, the date and time of scheduled arrival of first driver DA at point B is the same as the date and time of arrival of vehicle X at point B.

Next, in step S702, transportation plan preparation section 102a checks the date and time of scheduled arrival of second driver DD at point C. Here, transportation plan preparation section 102a checks driving plan information for second driver DD registered in transportation plan DB 101c. Note that, the date and time of scheduled arrival of second driver DD at point C is the same as the date and time of arrival of vehicle Y at point C.

Subsequently, in step S703, transportation plan preparation section 102a judges whether or not it is possible for vehicle X to arrive by the date and time of scheduled arrival at point C when vehicle X travels at a statutory speed. Here, transportation plan preparation section 102a calculates a difference time between the checked date and time of arrival of first driver DA at point B and the checked date and time of arrival of second driver DD at point C. Then, transportation plan preparation section 102a judges whether or not it is possible for vehicle X to arrive by the date and time of scheduled arrival at point C by traveling at the statutory speed from point B to point C within the calculated difference time. When it is judged that it is possible for vehicle X to arrive by the date and time of scheduled arrival at point C by traveling at a statutory speed, the process proceeds to step S704. On the other hand, when it is judged that it is impossible for vehicle X to arrive by the date and time of scheduled arrival at point C when traveling at a statutory speed (it is impossible for vehicle X to arrive in time unless vehicle X travels at a speed exceeding the speed limit), transportation plan preparation process 3 ends.

Subsequently, in step S704, transportation plan preparation section 102a judges whether or not it is possible for vehicle Y to arrive by the date and time of scheduled arrival at point B when vehicle Y travels at a statutory speed. Here, transportation plan preparation section 102a calculates a difference time between the checked date and time of arrival of second driver DD at point C and the checked date and time of arrival of first driver DA at point B. Then, transportation plan preparation section 102a judges whether or not it is possible for vehicle Y to arrive by the date and time of scheduled arrival at point B by traveling at the statutory speed from point C to point B within the calculated difference time. When it is judged that it is possible for vehicle Y to arrive by the date and time of scheduled arrival at point B by traveling at a statutory speed, the process proceeds to step S705. On the other hand, when it is judged that it is impossible for vehicle Y to arrive by the date and time of scheduled arrival at point B when traveling at a statutory speed (it is impossible for vehicle Y to arrive in time unless vehicle Y travels at a speed exceeding the speed limit), transportation plan preparation process 3 ends.

Subsequently, in step S705, transportation plan preparation section 102a judges whether or not parking spaces at point B and parking spaces at point C for parking of vehicles X and Y can be reserved. Judgement of whether or not the parking spaces can be reserved is performed by checking reservation statuses on the respective parking lot reservation websites of the smart IC operating companies. When it is judged that the parking spaces at point B and the parking spaces at point C for parking of vehicles X and Y can be reserved, the process proceeds to step S706. On the other hand, when it is judged that the parking spaces at point B and the parking spaces at point C for parking of one or both of vehicles X and Y cannot be reserved, the transportation plan preparation process ends.

When it is judged that the parking spaces at point B and the parking spaces at point C for parking of vehicles X and Y can be reserved, transportation plan preparation section 102a reserves the parking spaces at point B and the parking spaces at point C for parking of vehicles X and Y in step S706. Here, transportation plan preparation section 102a reserves the parking spaces on the respective parking lot reservation websites of the smart IC operating companies. Note that, when the parking space at point B for vehicle X is reserved, the reservation is for the time taking into consideration the date and time of scheduled arrival of vehicle X at point B and the date and time of scheduled departure of vehicle X from point B. Further, when the parking space at point B for vehicle Y is reserved, the reservation is for the time with an estimated surplus time (for example, the date and time of scheduled departure from point B+2 hours) taking into consideration the date and time of scheduled arrival of vehicle Y at point B, the date and time of scheduled departure from point B, and a delay in arrival of vehicle Y at point B that would be caused due to traffic congestion. Note that, when a point-B waiting time for vehicle Y at point B occurs (when vehicle Y waits a time equal to or longer than the surplus time with respect to the date and time of arrival of second driver DD at point C), the reservation is for the time taking into consideration the waiting time.

Further, when the parking space for vehicle Y at point C is reserved, the reservation is for the time taking into consideration the date and time of scheduled arrival of vehicle Y at point C and the date and time of scheduled departure of vehicle Y from point C. Further, when the parking space for vehicle X at point C is reserved, the reservation is for the time with an estimated surplus time (for example, the date and time of scheduled departure from point C+2 hours) taking into consideration the date and time of scheduled arrival of vehicle X at point C, the date and time of scheduled departure from point C, and a delay in arrival of vehicle X at point C that would be caused due to traffic congestion. Note that, when a point-C waiting time for vehicle X at point C occurs (when vehicle X waits a time equal to or longer than the surplus time with respect to the date and time of arrival of first driver DA at point B), the reservation is for the time taking into consideration the waiting time.

Subsequently, in step S707, transportation plan preparation section 102a calculates average travel speeds of vehicle X for respective sections. Here, transportation plan preparation section 102a calculates the average speeds for the respective sections (section B-1a, section B-2a, section B-3a, section B-4a, and section C) between point B and point C.

Subsequently, in step S708, transportation plan preparation section 102a sets the date and time of departure of vehicle X from point B and the date and time of arrival of vehicle X at point C based on the average speeds for the respective sections between point B and point C.

Subsequently, in step S709, transportation plan preparation section 102a calculates average travel speeds of vehicle Y for respective sections. Here, transportation plan preparation section 102a calculates the average speeds for the respective sections (section B-4b, section B-3b, section B-2b, section B-1b, and section B) between point C and point B.

Subsequently, in step S710, transportation plan preparation section 102a sets the date and time of departure of vehicle Y from point C and the date and time of arrival of vehicle Y at point B based on the average speeds for the respective sections between point C and point B Subsequently, in step S711, transportation plan preparation section 102a prepares travel plan information, and registers the prepared travel plan information in transportation plan DB 101c.

Subsequently, in step S712, transportation plan preparation section 102a transmits the travel plan information registered in transportation plan DB 101c to in-vehicle system 200 of vehicle X and in-vehicle system 200 of vehicle Y, which are targets of the travel plan. In addition, transportation plan preparation section 102a transmits the driving plan information registered in transportation plan DB 101c to driver terminal 300 possessed by first driver DA and driver terminal 300 possessed by second driver DD, which are targets of the driving plan. After the process of step S712 is executed, transportation plan preparation process 2 ends. Each of in-vehicle system 200 of vehicle X and in-vehicle system 200 of and vehicle Y receiving the travel plan information stores the travel plan information in travel plan storage section 204. Then, travel control section 209d causes vehicle X (vehicle Y) to travel in accordance with the travel plan information stored in travel plan storage section 204.

(Plan Change Process)

Next, a plan change process executed by transportation plan change section 102b will be described with reference to FIGS. 10 to 14.

Figure 10:
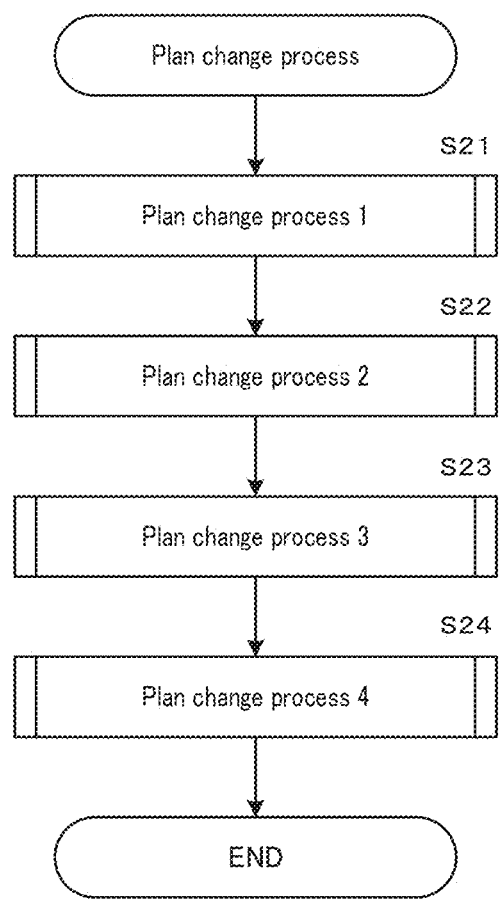
FIG. 10 is a flowchart illustrating a plan change process performed by a transportation plan change section.
Figure 11:
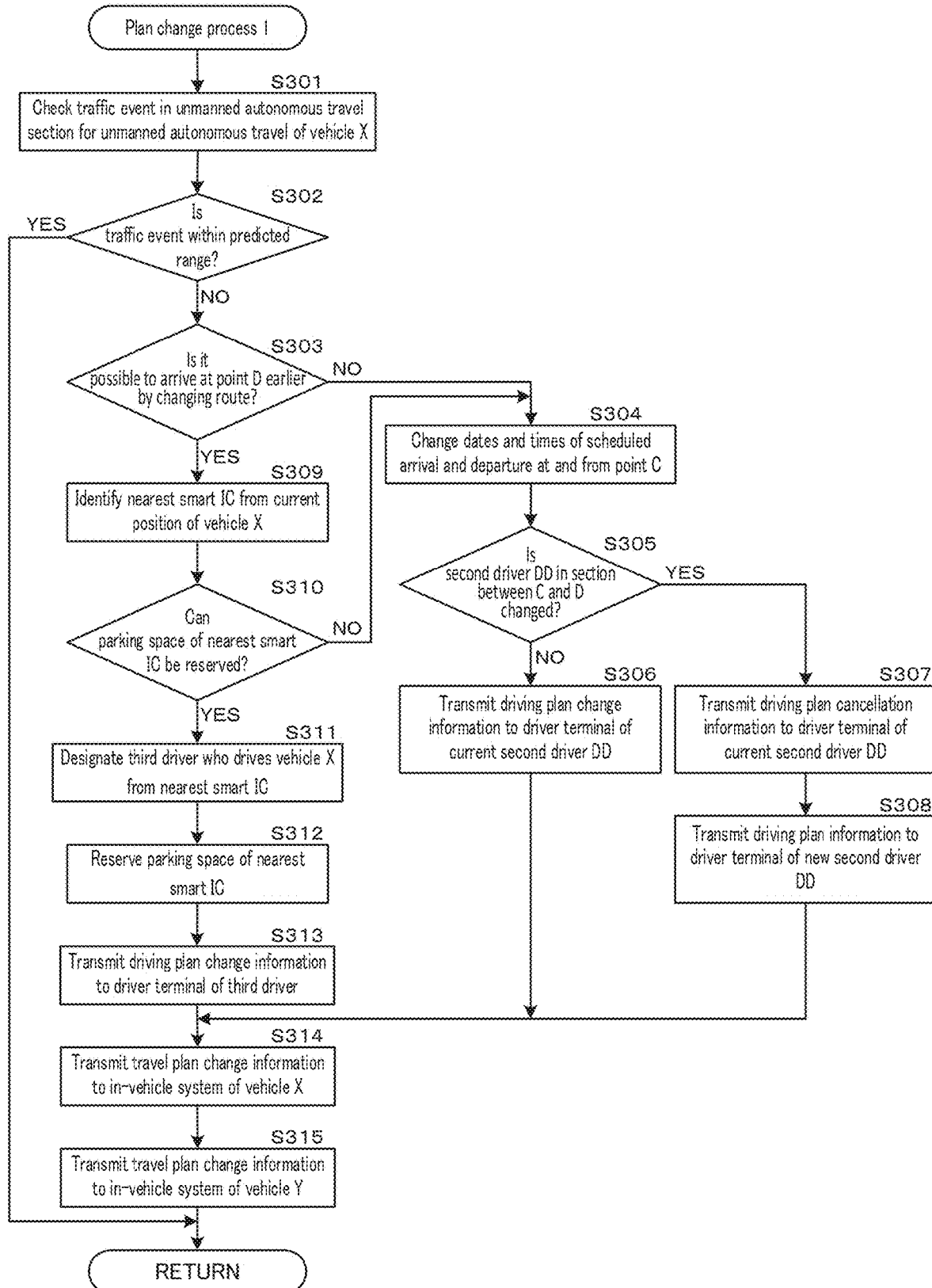
FIG. 11 is a flowchart illustrating plan change process 1 in the plan change process.
Figure 12:
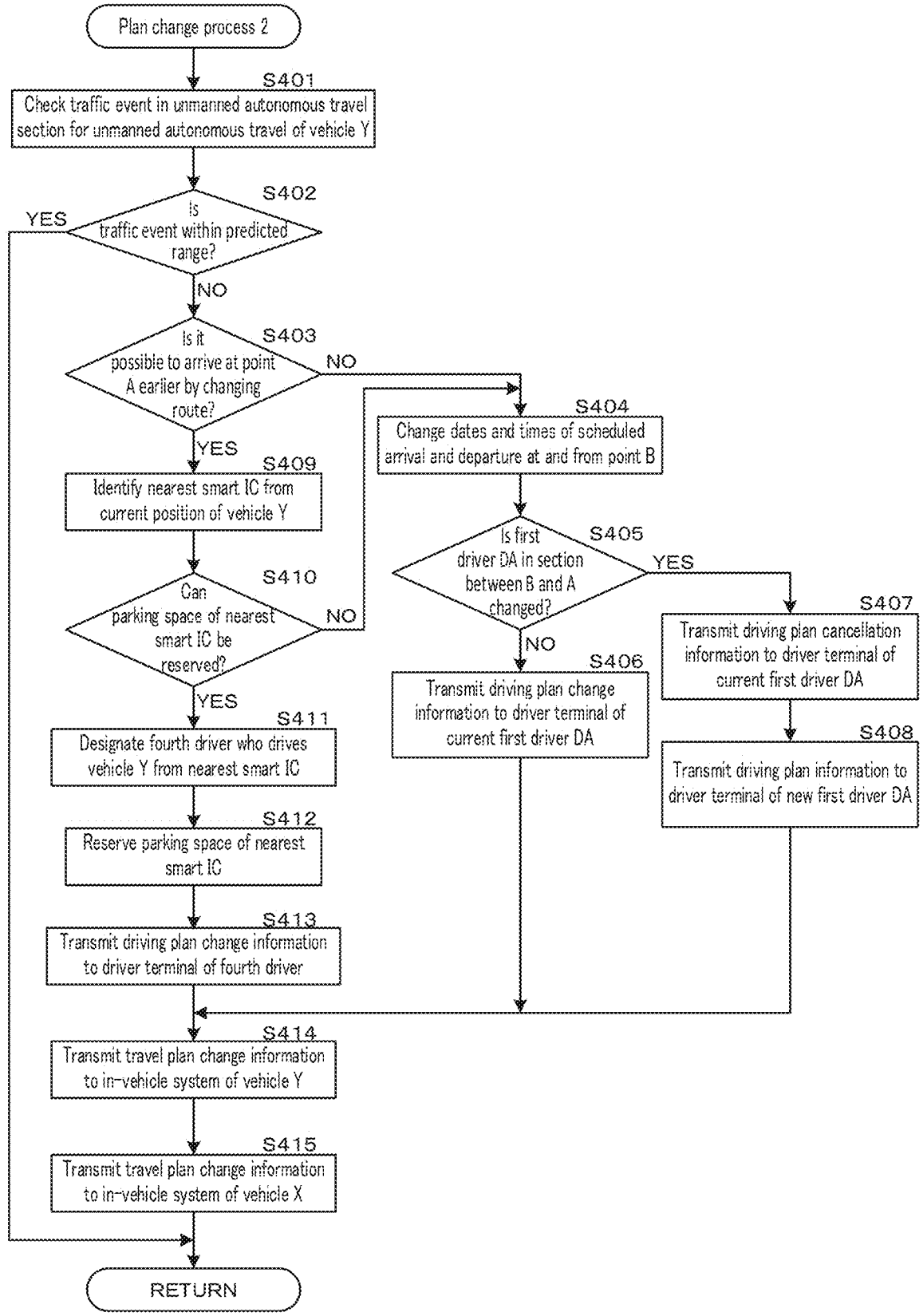
FIG. 12 is a flowchart illustrating plan change process 2 in the plan change process.
Figure 13:
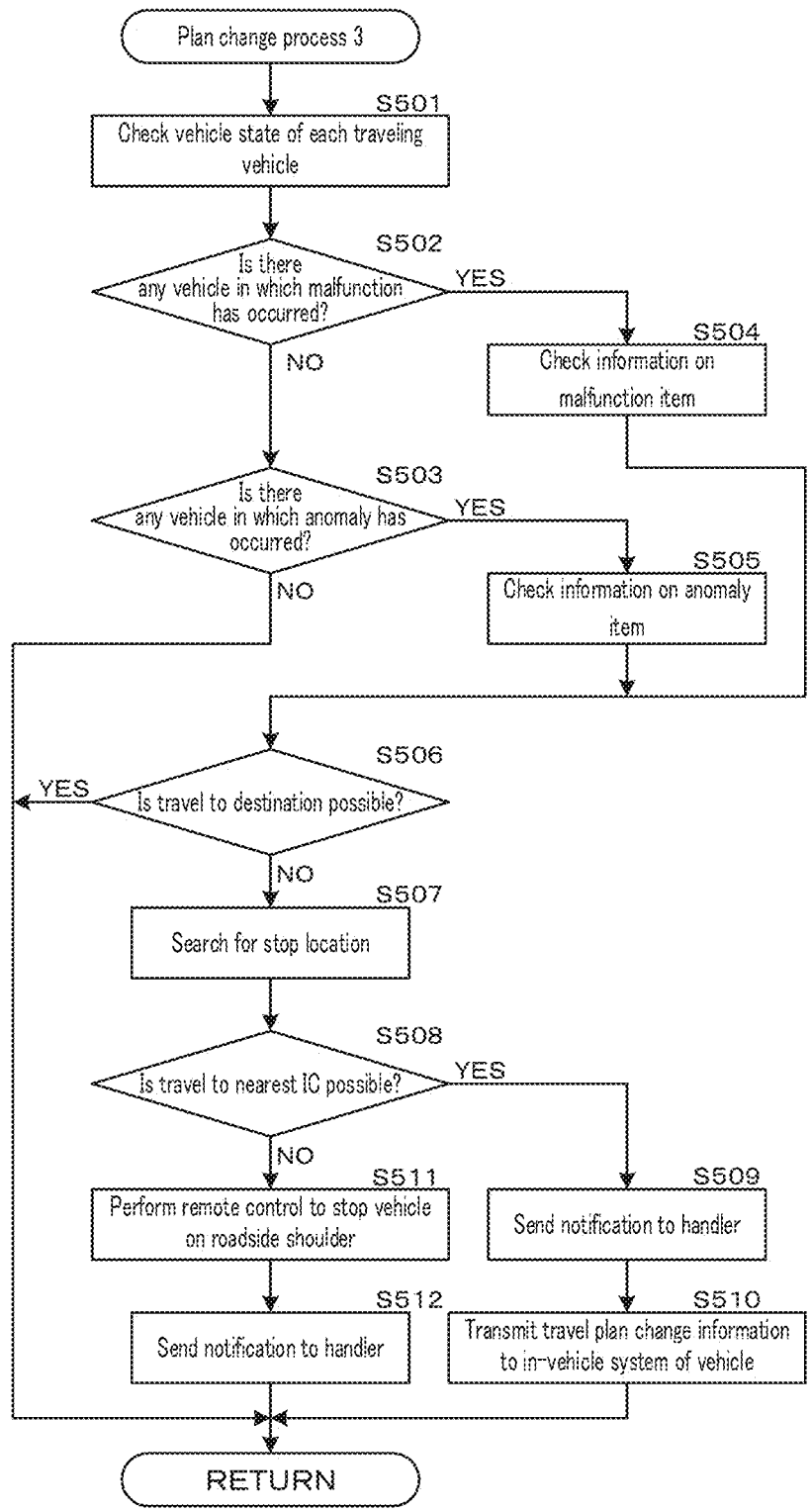
FIG. 13 is a flowchart illustrating plan change process 3 in the plan change process.
Figure 14:
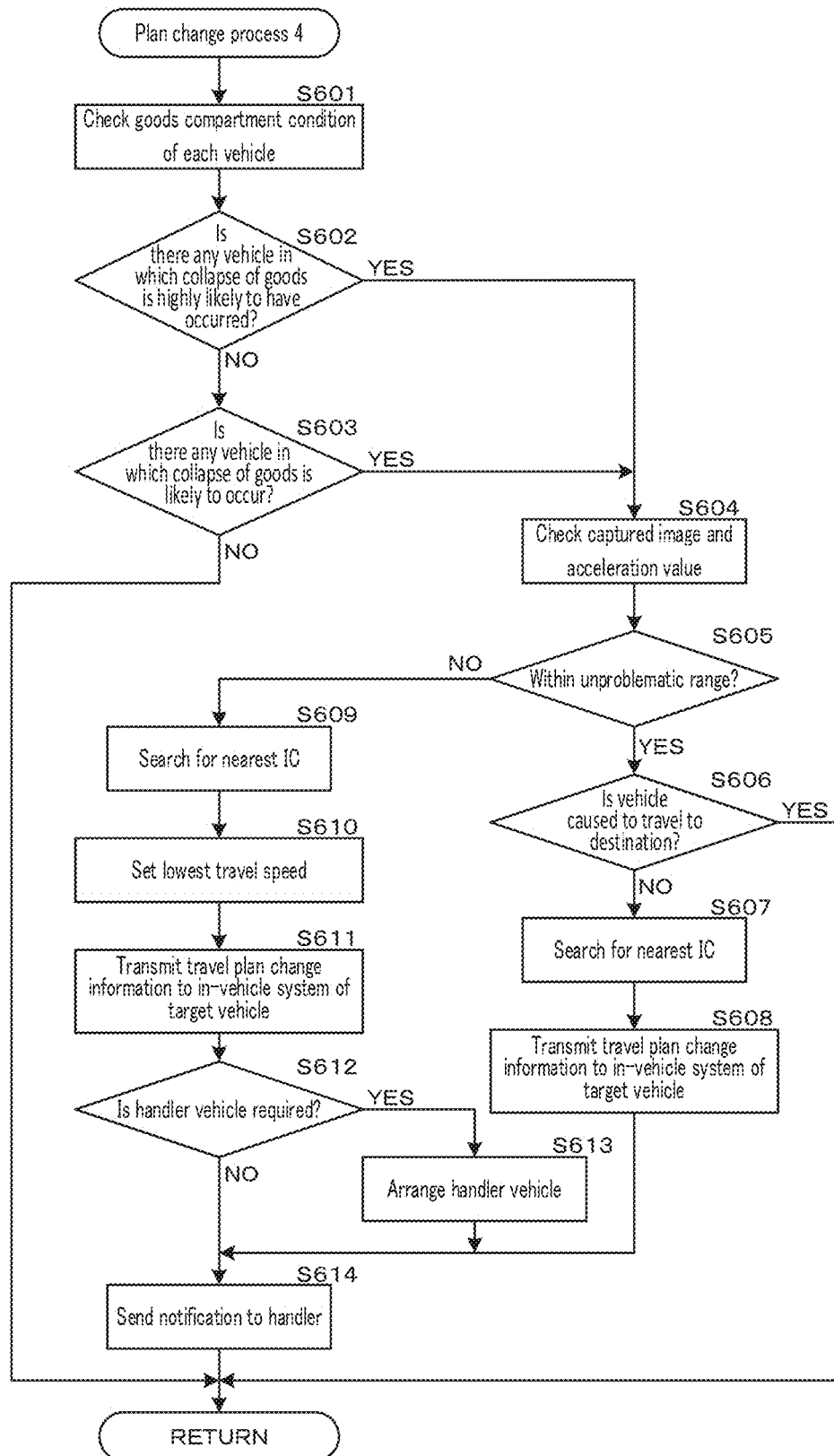
FIG. 14 is a flowchart illustrating plan change process 4 in the plan change process.

FIG. 10 is a flowchart illustrating the plan change process executed by transportation plan change section 102b. FIG. 11 is a flowchart illustrating plan change process 1 in the plan change process. FIG. 12 is a flowchart illustrating plan change process 2 in the plan change process. FIG. 13 is a flowchart illustrating plan change process 3 in the plan change process. FIG. 14 is a flowchart illustrating plan change process 4 in the plan change process.

To begin with, transportation plan change section 102b executes plan change process 1 in step S21.

Subsequently, transportation plan change section 102b executes plan change process 2 in step S22.

Subsequently, transportation plan change section 102b executes plan change process 3 in step S23.

Subsequently, transportation plan change section 102b executes plan change process 4 in step S24. In step S24, the plan change process ends after execution of plan change process 4.

(Plan Change Process 1)

Next, plan change process 1 will be described with reference to FIG. 11.

To begin with, in step S301, transportation plan change section 102b checks a traffic event in the unmanned travel section (between point B and point C) for unmanned travel of vehicle X. Here, transportation plan change section 102b checks the road traffic information on road traffic in the sections (section B-1a, section B-2a, section B-3a, and section B-4a, section C) between points B and C from the current road traffic information stored in traffic information DB 101b.

Subsequently, in step S302, transportation plan change section 102b judges, from the current road traffic information, whether or not any predicted traffic event has occurred. Here, the predicted traffic event means those traffic events which do not require a change in the scheduled point-C arrival date and time information or the scheduled point-C departure date and time information in the travel plan information on the travel plan for vehicle X in the transportation plan information stored in transportation plan DB 101c (such traffic events as occurrences of traffic congestion slightly larger than the expected range of traffic congestion). On the other hand, an unexpected traffic event is an unpredictable traffic event (e.g., an occurrence of traffic congestion that greatly exceeds the expected range of traffic congestion, or an occurrence of traffic congestion or a road closure caused by an accident, a vehicle having a trouble, a disaster, or the like).

The scheduled point-C arrival date and time information and the scheduled point-C departure date and time information for vehicle X are set in advance to include a margin. Therefore, when the traffic event judged to be absorbable in the scheduled point-C arrival date and time information for vehicle X or the scheduled point-C departure date and time information for vehicle X including this margin, transportation plan change section 102b judges that the traffic event is a traffic event which does not require a change. When it is judged that a predicted traffic event has occurred, plan change process 1 ends. On the other hand, when it is judged that the traffic event is not an occurrence of a predicted traffic event, the process proceeds to step S303.

When it is judged that the traffic event is not an occurrence of a predicted traffic event, transportation plan change section 102b judges in step S303 whether or not it is possible to arrive at point D earlier by changing the route. Here, transportation plan change section 102b checks the current road traffic information and the future road traffic prediction information stored in traffic information DB 101b, and then extracts a change candidate route. Then, it is judged which of the current route and the extracted change candidate route allows earlier arrival at point D. When it is judged that it is possible to arrive at point D earlier when the route is not changed, the process proceeds to step S304. On the other hand, when it is judged that it is possible to arrive at point D earlier by changing the route, the process proceeds to step S309.

When it is judged that it is possible to arrive at point D earlier when the route is not changed, transportation plan change section 102b changes the date and time of scheduled arrival of vehicle X at point C and the date and time of scheduled departure of vehicle X from point C in step S304. Here, transportation plan change section 102b changes the date and time of scheduled arrival at point C and the date and time of scheduled departure from point C after checking the current road traffic information and the future road traffic prediction information stored in traffic information DB 101b. At this time, according to the traffic event having occurred, the average travel speed for each section is recalculated and the average travel speed for each section is set again.

Subsequently, in step S305, transportation plan change section 102b judges whether or not to change second driver DD who drives from point C to point D. Here, transportation plan change section 102b checks a next driving plan for the driving of vehicle X for second driver DD who is a target for the driving plans for driving vehicle X stored in transportation plan DB 101c. When it is judged, based on the result of checking, that there is no obstacle to the next driving plan for second driver DD for driving vehicle X, it is judged that second driver DD driving from point C to point D is not changed. When it is judged that there is an obstacle to the next driving plan for second driver DD for driving vehicle X, it is judged that second driver DD driving from point C to point D is changed. When it is judged that second driver DD driving from point C to point D is not changed, the process proceeds to step S306. On the other hand, when it is judged that second driver DD driving from point C to point D is changed, the process proceeds to step S307.

When it is judged that second driver DD who drives from point C to point D is not changed, transportation plan change section 102b transmits the driving plan change information to the driver terminal of current second driver DD in step S306. Here, the transmitted driving plan change information includes information indicating that the date and time of arrival of vehicle X at point C has been changed, the changed point-C arrival date and time information and point-C departure date and time information for vehicle X, and the changed point-D arrival date and time information.

When it is judged that second driver DD who drives from point C to point D is changed, transportation plan change section 102b transmits, to the driver terminal of current second driver DD in step S307, driving plan cancellation information indicating that the driving plan for driving vehicle X from point C to point D has been cancelled.

Subsequently, in step S308, transportation plan change section 102b selects new second driver DD, and transmits, to the driver terminal of new second driver DD, driving plan information including information indicating that vehicle X is driven from point C to point D, point-C arrival date and time information for vehicle X, point-C parking position information, point-C departure date and time information, point-D arrival date and time information, unlocking key information for vehicle X, and locking key information for vehicle X. Here, in the selection of new second driver DD, transportation plan change section 102b selects second driver DD who is not scheduled to drive vehicle X from point C to point D from among second drivers DD who drive vehicle Y to arrive at point C near (±1 hour of) the changed date and time of arrival of vehicle X at point C. When such a second driver DD is not present, the driving plan for each second driver DD is checked, and second driver DD who drives vehicle X from point C to point D is designated.

When it is judged that it is possible to arrive at point D earlier by changing the route, transportation plan change section 102b identifies the nearest smart IC from the current position of vehicle X in step S309.

Subsequently, in step S310, transportation plan change section 102b judges whether or not the parking space of the nearest smart IC can be reserved. Here, the judgement of whether or not the parking space can be reserved is performed by checking the reservation status on a parking lot reservation website of an operating company of the nearest smart IC. When it is judged that the parking space of the nearest smart IC can be reserved, the process proceeds to step S311. On the other hand, when it is judged that the parking space of the nearest smart IC cannot be reserved, the process proceeds to step S304. Note that, when it is judged that the parking space of the nearest smart IC cannot be reserved, reservation statuses of parking spaces of one next smart IC and another may be checked.

When it is judged that the parking space of the nearest smart IC can be reserved, transportation plan change section 102b designates, in step S311, a third driver who drives vehicle X from the nearest smart IC. Here, first driver DA, second driver DD, or a driver other than first driver DA and second driver DD is designated as the third driver.

Subsequently, in step S312, transportation plan change section 102b reserves the parking space of the nearest smart IC. Here, transportation plan preparation section 102a reserves the parking space on the parking lot reservation website of the operating company of the nearest smart IC. Note that, the reservation is for the time taking into consideration that the arrival at the nearest smart IC would be made earlier or later due to traffic congestion, and the time and date of arrival of the third driver at the nearest smart IC.

Subsequently, in step S313, transportation plan change section 102b transmits the driving plan change information to the driver terminal of the third driver who drives to point D from the smart IC in which vehicle X is parked. Here, the transmitted driving plan change information includes information indicating that the travel plan for vehicle X has been changed, the location of the nearest smart IC where vehicle X arrives, the parking position information on the parking position of vehicle X at the nearest smart IC, the arrival date and time information on arrival of vehicle X at the nearest smart IC and the departure date information on departure of vehicle X from the nearest smart IC, the changed point-D arrival date and time information for vehicle X, the unlocking key information for vehicle X, and the locking key information for vehicle X.

Subsequently, in step S314, transportation plan change section 102b transmits the travel plan change information to in-vehicle system 200 of vehicle X. Here, transportation plan preparation section 102a registers the travel plan change information for vehicle X and the driving plan change information for vehicle X in transportation plan DB 101c.

Here, when the process of step S306 is executed to perform the process of step S314, the changed scheduled point-C arrival date and time information for vehicle X, the changed scheduled point-C departure date and time information for vehicle X, and the changed scheduled point-D arrival date and time information for vehicle X are transmitted as the travel plan change information for vehicle X.

Further, when the process of step S308 is executed to perform the process of step S314, the changed scheduled point-C arrival date and time information for vehicle X, the changed scheduled point-C departure date and time information for vehicle X, the changed scheduled point-D arrival date and time information for vehicle X, and the driver information on new second driver DD who drives vehicle X are transmitted as the travel plan change information.

When the process of step S313 is executed to perform the process of step S314, the parking position information on the parking position of vehicle X at the nearest smart IC, the scheduled arrival date and time information on the date and time of arrival of vehicle X at the nearest smart IC, the scheduled departure date and time information on the date and time of departure of vehicle X from the nearest smart IC, the changed scheduled point-D arrival date and time information for vehicle X, and the driver information on the third driver who drives vehicle X are transmitted as the travel plan change information.

Further, when delaying the date and time of scheduled arrival at point C of succeeding vehicle X traveling from point B to point C, transportation plan change section 102b transmits, to in-vehicle system 200 of succeeding vehicle X, the travel plan change information including the changed parking position information on the parking position of succeeding vehicle X at point C, the changed scheduled point-C arrival date and time information for succeeding vehicle X, the changed scheduled point-C departure date and time information for succeeding vehicle X, the changed scheduled point-D arrival date and time information for succeeding vehicle X, the changed driver information on second driver DD who drives succeeding vehicle X from point C to point D, and the like. Note that, in the case of delaying the date and time of scheduled arrival of succeeding vehicle X at point C, when the date and time of scheduled arrival at point C is delayed by causing succeeding vehicle X to wait at any smart IC between point B and point C, the travel plan change information including the parking position information on the parking position at the smart IC where the vehicle is scheduled to wait, the scheduled arrival information on scheduled arrival at the smart IC where the vehicle is scheduled to wait, the scheduled departure information on scheduled departure from the smart IC where the vehicle is scheduled to wait, the travel speed information on the travel speed for travel to the smart IC where the vehicle is scheduled to wait, the travel speed information on the travel speed for travel between the smart IC where the vehicle is scheduled to wait and point C, and the like is transmitted to in-vehicle system 200 of succeeding vehicle X.

In-vehicle system 200 of vehicle X (or, succeeding vehicle X) having received the travel plan change information stores the travel plan change information in travel plan storage section 204. Then, travel control section 209d changes the travel control in accordance with the travel plan change information stored in travel plan storage section 204 to cause vehicle X (or succeeding vehicle X) to travel.

Driver terminal 300 having received the driving plan change information stores the received driving plan change information in driving plan storage section 303. Then, according to the driving plan change information stored in driving plan storage section 303, second driver DD or the third driver drives vehicle X.

Subsequently, in step S315, transportation plan change section 102b transmits the travel plan change information to in-vehicle system 200 of vehicle Y. Here, transportation plan preparation section 102a registers the travel plan change information for vehicle Y and the driving plan change information for vehicle Y in transportation plan DB 101c.

Here, when delaying the date and time of scheduled arrival of vehicle Y at point C, transportation plan change section 102b transmits, to in-vehicle system 200 of vehicle Y, the travel plan change information including changed scheduled point-D departure date and time information for vehicle Y, changed point-C parking position information for vehicle Y, changed scheduled point-C arrival date and time information for vehicle Y, changed scheduled point-C departure date and time information for vehicle Y, changed point-B parking position information for vehicle Y, changed scheduled point-B arrival date and time information for vehicle Y, changed scheduled point-B departure date and time information for vehicle Y, changed scheduled point-A departure date and time information for vehicle Y, changed driver information on second driver DD who drives vehicle Y from point D to point C, changed driver information on first driver DA who drives vehicle Y from point B to point A, and the like.

Further, when delaying the date and time of scheduled arrival at point B of preceding vehicle Y traveling from point C to point B, transportation plan change section 102b transmits, to in-vehicle system 200 of preceding vehicle Y, the travel plan change information including the changed parking position information on the parking position of preceding vehicle Y at point B, the changed scheduled point-B arrival date and time information for preceding vehicle Y, the changed scheduled point-B departure date and time information for preceding vehicle Y, the changed scheduled point-A arrival date and time information for preceding vehicle Y, the changed driver information on first driver DA who drives preceding vehicle Y from point B to point A and the like. Note that, in the case of delaying the date and time of scheduled arrival of preceding vehicle Y at point B, when the date and time of scheduled arrival at point B is delayed by causing preceding vehicle Y to wait at any smart IC between point C and point B, the travel plan change information including the parking position information on the parking position at the smart IC where the vehicle is scheduled to wait, the scheduled arrival information on scheduled arrival at the smart IC where the vehicle is scheduled to wait, the scheduled departure information on scheduled departure from the smart IC where the vehicle is scheduled to wait, the travel speed information on the travel speed for travel to the smart IC where the vehicle is scheduled to wait, the travel speed information on the travel speed for travel between the smart IC where the vehicle is scheduled to wait and point B, and the like is transmitted to in-vehicle system 200 of preceding vehicle Y.

In-vehicle system 200 of vehicle Y (or, preceding vehicle Y) having received the travel plan change information stores the travel plan change information in travel plan storage section 204. Then, travel control section 209d changes the travel control in accordance with the travel plan change information stored in travel plan storage section 204 to cause vehicle Y (or preceding vehicle Y) to travel.

After the process of step S315 is executed, plan change process 1 ends.

(Plan Change Process 2)

Next, plan change process 2 will be described with reference to FIG. 12.

To begin with, in step S401, transportation plan change section 102b checks a traffic event in the unmanned travel section (between point C and point B) for unmanned travel of vehicle Y. Here, transportation plan change section 102b checks the road traffic information on road traffic in the sections (section B-4b, section B-3b, section B-2b, and section B-1b, section B) between points C and B from the current road traffic information stored in traffic information DB 101b.

Subsequently, in step S402, transportation plan change section 102b judges, from the current road traffic information, whether or not any predicted traffic event has occurred. Here, the predicted traffic event means those traffic events which do not require a change in the scheduled point-B arrival date and time information or the scheduled point-B departure date and time information in the travel plan information on the travel plan for vehicle Y in the transportation plan information stored in transportation plan DB 101c (such traffic events as occurrences of traffic congestion slightly larger than the expected range of traffic congestion). On the other hand, an unexpected traffic event is an unpredictable traffic event (e.g., an occurrence of a traffic congestion that greatly exceeds the expected range of a traffic congestion, or an occurrence of a traffic congestion or a road closure caused by an accident, a vehicle having a trouble, a disaster, or the like).

The scheduled point-B arrival date and time information and the scheduled point-B departure date and time information for vehicle Y are set in advance to include a margin. Therefore, when the traffic event judged to be absorbable in the scheduled point-B arrival date and time information for vehicle Y or the scheduled point-B departure date and time information for vehicle Y including this margin, transportation plan change section 102b judges that the traffic event is a traffic event which does not require a change. When it is judged that a predicted traffic event has occurred, plan change process 1 ends. On the other hand, when it is judged that the traffic event is not an occurrence of a predicted traffic event, the process proceeds to step S403.

When it is judged that the traffic event is not an occurrence of a predicted traffic event, transportation plan change section 102b judges whether or not it is possible to arrive at point A earlier by changing the route in step S403. Here, transportation plan change section 102b checks the current road traffic information and the future road traffic prediction information stored in traffic information DB 101b, and then extracts a change candidate route. Then, it is judged which of the current route and the extracted change candidate route allows earlier arrival at point A. When it is judged that it is possible to arrive at point A earlier when the route is not changed, the process proceeds to step S404. On the other hand, when it is judged that it is possible to arrive at point A earlier by changing the route, the process proceeds to step S409.

When it is judged that it is possible to arrive at point A earlier when the route is not changed, transportation plan change section 102b changes the date and time of scheduled arrival of vehicle Y at point B and the date and time of scheduled departure of vehicle Y from point B in step S404. Here, transportation plan change section 102b changes the date and time of scheduled arrival at point B and the date and time of scheduled departure from point B after checking the current road traffic information and the future road traffic prediction information stored in traffic information DB 101b. At this time, according to the traffic event having occurred, the average travel speed for each section is recalculated and the average travel speed for each section is set again.

Subsequently, in step S405, transportation plan change section 102b judges whether or not to change first driver DA who drives from point B to point A. Here, transportation plan change section 102b checks a next driving plan for the driving of vehicle Y for first driver DA who is a target for the driving plans for driving vehicle Y stored in transportation plan DB 101c. When it is judged, based on the result of checking, that there is no obstacle to the next driving plan for first driver DA for driving vehicle Y, it is judged that first driver DA driving from point B to point A is not changed. When it is judged that there is an obstacle to the next driving plan for first driver DA for driving vehicle Y, it is judged that first driver DA driving from point B to point A is changed. When it is judged that first driver DA driving from point B to point A is not changed, the process proceeds to step S406. On the other hand, when it is judged that first driver DA driving from point B to point A is changed, the process proceeds to step S407.

When it is judged that first driver DA who drives from point B to point A is not changed, transportation plan change section 102b transmits the driving plan change information to the driver terminal of current first driver DA in step S406. Here, the transmitted driving plan change information includes information indicating that the date and time of arrival of vehicle Y at point B has been changed, the changed point-B arrival date and time information and point-B departure date and time information for vehicle Y, and the changed point-A arrival date and time information.

When it is judged that first driver DA who drives from point B to A is changed, transportation plan change section 102b transmits driving plan cancellation information indicating that the driving plan for driving vehicle Y from point B to A has been cancelled to the driver terminal of current first driver DA in step S407.

Subsequently, in step S408, transportation plan change section 102b selects new first driver DA, and transmits, to the driver terminal of new first driver DA, driving plan information including information indicating that vehicle Y is driven from point B to point A, point-B arrival date and time information for vehicle Y, point-B parking position information, point-B departure date and time information, point-A arrival date and time information, unlocking key information for vehicle Y, and locking key information for vehicle Y. Here, in the selection of new first driver DA, transportation plan change section 102b selects first driver DA who is not scheduled to drive vehicle Y from point B to point A from among first drivers DA who drive vehicle X to arrive at point B near (±1 hour of) the changed date and time of arrival of vehicle Y at point B. When such a first driver DA is not present, the driving plan for each first driver DA is checked, and first driver DA who drives vehicle Y from point B to point A is designated.

When it is judged that it is possible to arrive at point A earlier by changing the route, transportation plan change section 102b identifies the nearest smart IC from the current position of vehicle Y in step S409.

Subsequently, in step S410, transportation plan change section 102b judges whether or not the parking space of the nearest smart IC can be reserved. Here, the judgement of whether or not the parking space can be reserved is performed by checking the reservation status on a parking lot reservation website of an operating company of the nearest smart IC. When it is judged that the parking space of the nearest smart IC can be reserved, the process proceeds to step S411. On the other hand, when it is judged that the parking space of the nearest smart IC cannot be reserved, the process proceeds to step S404. Note that, when it is judged that the parking space of the nearest smart IC cannot be reserved, reservation statuses of parking spaces of one next smart IC and another may be checked.

When it is judged that the parking space of the nearest smart IC can be reserved, transportation plan change section 102b designates, in step S411, a fourth driver who drives vehicle Y from the nearest smart IC. Here, first driver DA, second driver DD, or a driver other than first driver DA and second driver DD is designated as the fourth driver.

Subsequently, in step S412, transportation plan change section 102b reserves the parking space of the nearest smart IC. Here, transportation plan preparation section 102a reserves the parking space on the parking lot reservation website of the operating company of the nearest smart IC. Note that, the reservation is for the time taking into consideration that the arrival at the nearest smart IC would be made earlier or later due to traffic congestion, and the time and date of arrival of the fourth driver at the nearest smart IC.

Subsequently, in step S413, transportation plan change section 102b transmits the driving plan change information to the driver terminal of the fourth driver who drives to point A from the smart IC in which vehicle Y is parked. Here, the transmitted driving plan change information includes information indicating that the travel plan for vehicle Y has been changed, the location of the nearest smart IC where vehicle Y arrives, the parking position information on the parking position of vehicle Y at the nearest smart IC, the arrival date and time information on arrival of vehicle Y at the nearest smart IC and the departure date information on departure of vehicle Y from the nearest smart IC, the changed point-D arrival date and time information for vehicle Y, the unlocking key information for vehicle Y, and the locking key information for vehicle Y.

Subsequently, in step S414, transportation plan change section 102b transmits the travel plan change information to in-vehicle system 200 of vehicle Y. Here, transportation plan preparation section 102a registers the travel plan change information and the driving plan change information in transportation plan DB 101c.

Further, when the process of step S406 is executed to perform the process of step S414, the changed scheduled point-B arrival date and time information, the changed scheduled point-B departure date and time information, and the changed scheduled point-A arrival date and time information are transmitted as the travel plan change information.

Here, when the process of step S408 is executed to perform the process of step S414, the changed scheduled point-B arrival date and time information, the changed scheduled point-B departure date and time information, the changed scheduled point-A arrival date and time information, and the driver information on new first driver DA are transmitted as the travel plan change information.

When the process of step S413 is executed to perform the process of step S414, the parking position information on the parking position at the nearest smart IC, the scheduled arrival date and time information on the date and time of arrival at the nearest smart IC, the scheduled departure date and time information on the date and time of departure from the nearest smart IC, the changed scheduled point-A arrival date and time information, and the driver information on the fourth driver are transmitted as the travel plan change information.

Further, when delaying the date and time of scheduled arrival at point B of succeeding vehicle Y traveling from point C to point B, transportation plan change section 102b transmits, to in-vehicle system 200 of succeeding vehicle Y, the travel plan change information including the changed parking position information on the parking position of succeeding vehicle Y at point B, the changed scheduled point-B arrival date and time information for succeeding vehicle Y, the changed scheduled point-B departure date and time information for succeeding vehicle Y, the changed scheduled point-A arrival date and time information for succeeding vehicle Y, the changed driver information on first driver DA who drives succeeding vehicle Y from point B to point A and the like. Note that, in the case of delaying the date and time of scheduled arrival of succeeding vehicle Y at point B, when the date and time of scheduled arrival at point B is delayed by causing succeeding vehicle Y to wait at any smart IC between point C and point B, the travel plan change information including the parking position information on the parking position at the smart IC where the vehicle is scheduled to wait, the scheduled arrival information on scheduled arrival at the smart IC where the vehicle is scheduled to wait, the scheduled departure information on scheduled departure from the smart IC where the vehicle is scheduled to wait, the travel speed information on the travel speed for travel to the smart IC where the vehicle is scheduled to wait, the travel speed information on the travel speed for travel between the smart IC where the vehicle is scheduled to wait and point B, and the like is transmitted to in-vehicle system 200 of succeeding vehicle Y.

In-vehicle system 200 of each vehicle Y (or, succeeding vehicle Y) having received the travel plan change information stores the travel plan change information in travel plan storage section 204. Then, travel control section 209d changes the travel control in accordance with the travel plan change information stored in travel plan storage section 204 to cause vehicle Y (or succeeding vehicle Y) to travel. Driver terminal 300 having received the driving plan change information stores the received driving plan change information in driving plan storage section 303. Then, according to the driving plan change information stored in driving plan storage section 303, first driver DA or the fourth driver drives vehicle Y.

Subsequently, in step S415, transportation plan change section 102b transmits the travel plan change information to in-vehicle system 200 of vehicle X. Here, transportation plan preparation section 102a registers the travel plan change information for vehicle X and the driving plan change information for vehicle X in transportation plan DB 101c.

Here, when delaying the date and time of scheduled arrival of vehicle X at point B, transportation plan change section 102b transmits, to in-vehicle system 200 of vehicle X, the travel plan change information including changed scheduled point-A departure date and time information for vehicle X, changed point-B parking position information for vehicle X, changed scheduled point-B arrival date and time information for vehicle X, changed scheduled point-B departure date and time information for vehicle X, changed point-C parking position information for vehicle X, changed scheduled point-C arrival date and time information for vehicle X, changed scheduled point-C departure date and time information for vehicle X, changed scheduled point-D departure date and time information for vehicle X, changed driver information on first driver DA who drives vehicle X from point A to point B, changed driver information on second driver DD who drives vehicle X from point C to point D, and the like.

Further, when delaying the date and time of scheduled arrival at point C of preceding vehicle X traveling from point B to point C, transportation plan change section 102b transmits, to in-vehicle system 200 of preceding vehicle X, the travel plan change information including the changed parking position information on the parking position of preceding vehicle X at point C, the changed scheduled point-C arrival date and time information for preceding vehicle X, the changed scheduled point-C departure date and time information for preceding vehicle X, the changed scheduled point-D arrival date and time information for preceding vehicle X, the changed driver information on second driver DD who drives preceding vehicle X from point C to point D, and the like. Note that, in the case of delaying the date and time of scheduled arrival of preceding vehicle X at point C, when the date and time of scheduled arrival at point C is delayed by causing preceding vehicle X to wait at any smart IC between point B and point C, the travel plan change information including the parking position information on the parking position at the smart IC where the vehicle is scheduled to wait, the scheduled arrival information on scheduled arrival at the smart IC where the vehicle is scheduled to wait, the scheduled departure information on scheduled departure from the smart IC where the vehicle is scheduled to wait, the travel speed information on the travel speed for travel to the smart IC where the vehicle is scheduled to wait, the travel speed information on the travel speed for travel between the smart IC where the vehicle is scheduled to wait and point C, and the like is transmitted to in-vehicle system 200 of succeeding vehicle X.

In-vehicle system 200 of vehicle X (or, preceding vehicle X) having received the travel plan change information stores the travel plan change information in travel plan storage section 204. Then, travel control section 209d changes the travel control in accordance with the travel plan change information stored in travel plan storage section 204 to cause vehicle X (or preceding vehicle X) to travel.

After the process of step S415 is executed, plan change process 2 ends.

(Plan Change Process 3)

Next, plan change process 3 will be described with reference to FIG. 13.

First, in step S501, transportation plan change section 102b checks the vehicle state of each of traveling vehicles X and Y. Here, checking the vehicle states of traveling vehicles X and Y is executed by checking statuses managed by vehicle state management section 102c.

Subsequently, in step S502, transportation plan change section 102b judges whether or not there is any vehicle in which a malfunction has occurred. When it is judged that there is no vehicle in which a malfunction has occurred, the process proceeds to step S503. On the other hand, when it is judged that there is a vehicle in which a malfunction has occurred, the process proceeds to step S504. Here, the judgement is performed by transportation plan change section 102b by checking whether or not there is an item indicating a malfunction among items (vehicle-external-condition, throttle control, brake control, steering control, drive control, and the like) managed by vehicle state management section 102c.

When it is judged that there is no vehicle in which a malfunction has occurred, transportation plan change section 102b judges in step S503 whether or not there is a vehicle in which an anomaly has occurred. When it is judged that there is no vehicle in which an anomaly has occurred, plan change process 3 ends. On the other hand, when it is judged that there is a vehicle in which an anomaly has occurred, the process proceeds to step S505. Here, the judgement is performed by transportation plan change section 102b by checking whether or not there is an item indicating an anomaly among items (vehicle-external-condition, throttle control, brake control, steering control, drive control, and the like) managed by vehicle state management section 102c.

When it is judged that there is a vehicle in which a malfunction has occurred, transportation plan change section 102b checks, in step S504, information (control value and the like) on the item for which the malfunction has occurred.

Further, when it is judged that there is a vehicle in which an anomaly has occurred, transportation plan change section 102b checks, in step S505, the information (control value and the like) on the item for which the anomaly has occurred.

Subsequently, in step S506, transportation plan change section 102b judges whether or not the malfunction or the anomaly disables the vehicle to travel to a destination (the destination of point C in the case of vehicle X; the destination of point B in the case of vehicle Y). Note that, this judgment is performed based on one or both of determination based on a determination criterion programmed in transportation plan change section 102b and determination by an operator or the like. When it is judged that the malfunction or the anomaly does not disable the vehicle to travel to the destination, plan change process 3 ends. On the other hand, when it is judged that the malfunction or the anomaly disables (or makes it difficult for) the vehicle to travel to the destination, the process proceeds to step S507.

When it is judged that the malfunction or the anomaly disables (or makes it difficult for) the vehicle to travel to the destination, transportation plan change section 102b checks, in step S508, the current position of vehicle X (vehicle Y) in which the malfunction or anomaly has occurred, calculates the distance from the current position to the nearest smart IC, and then judges, based on the degree of the malfunction or anomaly occurred, whether or not vehicle X (vehicle Y) can travel to the nearest smart IC. When it is judged, based on the degree of the malfunction or anomaly occurred, that it is possible for vehicle X (vehicle Y) to travel to the nearest smart IC, the process proceeds to step S509. On the other hand, when it is judged, based on the degree of the malfunction or anomaly occurred, that it is impossible (difficult) for vehicle X (vehicle Y) to travel to the nearest smart IC, the process proceeds to step S511.

When it is judged that it is possible for vehicle X (vehicle Y) to travel to the nearest smart IC, transportation plan change section 102b sends a notification (notice) to a handler in step S509. Here, the handler is a third driver, a fourth driver, or a fifth driver. When travel to the nearest smart IC is possible, unmanned autonomous travel is likely to be difficult, but travel by manned travel may be possible. Therefore, the third driver, the fourth driver, or the fifth driver capable of driving vehicle X or Y is selected and a notification (notice) is sent to the selected driver. Here, the third driver, the fourth driver, or the fifth driver is selected according to a selection criterion programmed in transportation plan change section 102b, or is selected by the operator or the like. Emergency handling information is transmitted to driver terminal 300 of the selected third driver, fourth driver, or fifth driver. This emergency handling information includes the vehicle number of vehicle X (vehicle Y) in which the malfunction or anomaly has occurred, unlocking key information for vehicle X (vehicle Y) in which the malfunction or anomaly has occurred, locking key information for vehicle X (vehicle Y) in which the malfunction or anomaly has occurred, parking position information on the parking position at the smart IC where vehicle X (vehicle Y) in which the malfunction or anomaly has occurred is parked, and the like. The third driver, the fourth driver, or the fifth driver who possesses driver terminal 300 receiving this emergency handling information handles the situation based on the emergency handling information.

Subsequently, in step S510, transportation plan change section 102b transmits the travel plan change information to in-vehicle system 200 of vehicle X (vehicle Y) in which the malfunction or anomaly has occurred. Here, the transmitted plan change information includes the parking position information on the parking position at the nearest smart IC, travel speed information on the speed for travel to the nearest smart IC, and handler information. After the process of step S510 is executed, plan change process 3 ends.

When it is judged that it is impossible (or difficult) for vehicle X (vehicle Y) to travel to the nearest smart IC, transportation plan change section 102b, in step S511, searches for a roadside shoulder on which vehicle X (vehicle Y) is allowed to stop, and drives vehicle X (vehicle Y) toward the roadside shoulder by remote operation. The driving by remote operation is executed by the operator or the like. Note that, vehicle X (vehicle Y) may autonomously drive toward the nearest roadside shoulder by its own determination without remote operation.

Subsequently, in step S512, transportation plan change section 102b sends a notification (notice) to a handler. Here, the handler is a wrecker or the like. In situations where the vehicle must be stopped on a roadside shoulder, it is highly likely that driving the vehicle is dangerous. Thus, the notification (or notice) is sent to the wrecker for vehicle X or Y to be moved from the roadside shoulder. Here, the wrecker is selected from among wreckers in a program in transportation plan change section 102b, or is selected by the operator or the like. The stop position and the like of vehicle X or Y are notified to the selected wrecker. After the process of step S512 is executed, plan change process 3 ends.

(Plan Change Process 4)

Next, plan change process 4 will be described with reference to FIG. 14.

First, in step S601, transportation plan change section 102b checks the goods compartment condition of each of traveling vehicles X and Y. Here, checking the goods compartment conditions of traveling vehicles X and Y is executed by checking statuses managed by goods compartment condition management section 102d.

Subsequently, in step S602, transportation plan change section 102b judges whether or not there is any vehicle in which collapse of goods is highly likely to have occurred. When it is judged that there is no vehicle in which collapse of goods is highly likely to have occurred, the process proceeds to step S603. On the other hand, when it is judged that there is a vehicle in which collapse of goods is highly likely to have occurred, the process proceeds to step S604. Here, the judgement by transportation plan change section 102b is performed by checking the goods compartment condition information managed by goods compartment condition management section 102d.

When it is judged that there is no vehicle in which collapse of goods is highly likely to have occurred, transportation plan change section 102b judges in step S603 whether or not there is a vehicle in which collapse of goods is likely to occur. When it is judged that there is no vehicle in which collapse of goods is likely to occur, plan change process 4 ends. On the other hand, when it is judged that there is a vehicle in which collapse of goods is likely to occur, the process proceeds to step S604. Here, the judgement by transportation plan change section 102b is performed by checking the goods compartment condition information managed by goods compartment condition management section 102d.

When judging that there is a vehicle in which collapse of goods is highly likely to have occurred or there is a vehicle in which collapse of goods is likely to occur, transportation plan change section 102b checks each captured image information and each acceleration value in step S604. The check in this step is executed based on one or both of a check by comparison with comparison target image information and/or a comparison target acceleration value in a program in transportation plan change section 102b, and, a visual check by the operator or the like.

Subsequently, in step S605, transportation plan change section 102b judges whether or not the result of the check indicates that the collapse of goods is within an unproblematic range. When it is judged that the collapse of goods is within the unproblematic range, the process proceeds to step S606. On the other hand, when it is judged that the collapse of goods is problematic collapse, the process proceeds to step S609.

When it is judged that the collapse of goods is within the unproblematic range, transportation plan change section 102b judges whether or not to cause the vehicle to travel to the destination (the destination of point C in the case of vehicle X; the destination of point B in the case of vehicle Y) in step S606. Note that, this judgment is performed based on one or both of determination based on a determination criterion programmed in transportation plan change section 102b and determination by an operator or the like. When it is judged that the vehicle is caused to travel to the destination, plan change process 3 ends. On the other hand, when it is judged that the vehicle is not caused to travel to the destination, the process proceeds to step S607.

When it is judged that the vehicle is not caused to travel to the destination, transportation plan change section 102b checks, in step S607, the current position of vehicle X (vehicle Y) in which the collapse of goods is likely to have occurred or the collapse of goods is highly likely to occur, and searches for the nearest smart IC from the current position. Here, transportation plan change section 102b selects a handler (a third driver, a fourth driver, or a fifth driver who can drive vehicles X and Y).

Subsequently, in step S608, transportation plan change section 102b transmits the travel plan change information to in-vehicle system 200 of vehicle X (vehicle Y) in which the collapse of goods is likely to have occurred or the collapse of goods is highly likely to occur. Here, the transmitted plan change information includes the parking position information on the parking position at the nearest smart IC, travel speed information on the speed for travel to the nearest smart IC, and handler information.

When it is judged that the collapse of goods is problematic collapse, transportation plan change section 102b checks, in step S608, the current position of vehicle X (vehicle Y) in which the collapse of goods is likely to have occurred or the collapse of goods is highly likely to occur, and searches for the nearest smart IC from the current position.

Subsequently, in step S610, transportation plan change section 102b sets, to the lowest travel speed in the section, the travel speed of vehicle X (vehicle Y) in which the collapse of goods is likely to have occurred or the collapse of goods is highly likely to occur.

Subsequently, in step S611, transportation plan change section 102b transmits the travel plan change information to in-vehicle system 200 of vehicle X (vehicle Y) in which the collapse of goods is likely to have occurred or the collapse of goods is highly likely to occur. Here, the transmitted plan change information includes the parking position information on the parking position at the nearest smart IC, travel speed information on the speed for travel to the nearest smart IC (lowest travel speed), and handler information.

Subsequently, in step S612, transportation plan change section 102b judges whether or not a handler vehicle is required. In this case, the handler vehicle is a vehicle to which the goods are transferred. When it is judged that the handler vehicle is required, the process proceeds to step S613. On the other hand, when it is judged that the handler vehicle is not required, the process proceeds to step S614.

When it is judged that the handler vehicle is required, transportation plan change section 102b arranges the handler vehicle in step S613. Here, the handler vehicle is arranged from among handler vehicles in a program in transportation plan change section 102b, or arranged by the operator or the like.

Subsequently, in step S614, transportation plan change section 102b sends a notification to the handler. Here, when the process of step S613 is performed, emergency handling information including information indicating that the handler vehicle is driven to the nearest smart IC, the parking position at the nearest smart IC for vehicle X (vehicle Y) in which the collapse of goods is likely to have occurred or the collapse of goods is highly likely to occur, the unlocking key information for vehicle X (vehicle Y) in which the collapse of goods is likely to have occurred or the collapse of goods is highly likely to occur, and the locking key information for vehicle X (vehicle Y) in which the collapse of goods is likely to have occurred or the collapse of goods is highly likely to occur is transmitted to driver terminal 300 of the handler. Otherwise, the emergency handling information including the parking position at the nearest smart IC for vehicle X (vehicle Y) in which the collapse of goods is highly likely to occur, the unlocking key information for vehicle X (vehicle Y) in which the collapse of goods is likely to have occurred or the collapse of goods is highly likely to occur, and the locking key information for vehicle X (vehicle Y) in which the collapse of goods is likely to have occurred or the collapse of goods is highly likely to occur is transmitted to driver terminal 300 of the handler. The handler possessing driver terminal 300 receiving this emergency handling information handles the situation based on the emergency handling information. After the process of step S614 is executed, plan change process 4 ends.

Notes

In addition, in the embodiment of the present disclosure, a configuration shown below is disclosed.

(Note 1) A transportation management apparatus that manages a transportation system for causing a vehicle to travel in a section between a point A and a point B, a section between the point B and a point C, and a section between the point C and a point D to transport goods or the like from the point A to the point D and to transport goods or the like from the point D to the point A, the section between the point A and the point B being a first manned travel section, the section between the point B and the point C being an unmanned autonomous travel section, the section between the point C and the point D being a second manned travel section, in which a traffic condition of the unmanned autonomous travel section is predicted for preparation of a travel plan for a first vehicle that travels from the point B toward the point C and a travel plan for a second vehicle that travels from the point C toward the point B, a driving plan for a first driver who drives in the first manned travel section is prepared based on the travel plan for the first vehicle and the travel plan for the second vehicle, and a driving plan for a second driver who drives in the second manned travel section is prepared based on the travel plan for the first vehicle and the travel plan for the second vehicle.

(Note 2) The transportation management apparatus according to note 1, in which in the preparation of the travel plan for the first vehicle, an arrival schedule of arrival of the first vehicle at the point B is determined based on an arrival schedule of arrival of the first vehicle at the point C.

(Note 3) The transportation management apparatus according to note 1 or 2, in which in the preparation of the travel plan for the second vehicle, an arrival schedule of arrival of the second vehicle at the point C is determined based on an arrival schedule of arrival of the second vehicle at the point B.

(Note 4) The transportation management apparatus according to any one of notes 1 to 3, in which in the preparation of the travel plan for the first vehicle, an arrival schedule of arrival of the first vehicle at the point B is determined based on an arrival schedule of arrival of the second vehicle at the point B.

(Note 5) The transportation management apparatus according to any one of notes 1 to 4, in which in the preparation of the travel plan for the second vehicle, an arrival schedule of arrival of the second vehicle at the point C is determined based on an arrival schedule of arrival of the first vehicle at the point C.

(Note 6) The transportation management apparatus according to any one of notes 1 to 5, in which a booking status of a parking space for parking of the second vehicle at each of the point B and the point C is considered in the preparation of the travel plan for the second vehicle.

(Note 7) The transportation management apparatus according to any one of notes 1 to 6, in which in the preparation of the travel plan for the second vehicle, a travel speed of the second vehicle in the unmanned autonomous travel section is determined based on an arrival schedule of arrival of the second vehicle at the point B.

(Note 8) A transportation management method for managing a transportation system for causing a vehicle to travel in a section between a point A and a point B, a section between the point B and a point C, and a section between the point C and a point D to transport goods or the like from the point A to the point D and to transport goods or the like from the point D to the point A, the section between the point A and the point B being a first manned travel section, the section between the point B and the point C being an unmanned autonomous travel section, the section between the point C and the point D being a second manned travel section, the transportation management method including: predicting a traffic condition of the unmanned autonomous travel section to prepare a travel plan for a first vehicle that travels from the point B toward the point C and a travel plan for a second vehicle that travels from the point C toward the point B; preparing, based on the travel plan for the first vehicle and the travel plan for the second vehicle, a driving plan for a first driver who drives in the first manned travel section; and preparing, based on the travel plan for the first vehicle and the travel plan for the second vehicle, a driving plan for a second driver who drives in the second manned travel section.

(Note 9) A transportation management apparatus that manages a transportation system for transportation of goods or the like in which a vehicle is caused to perform unmanned autonomous travel based on a travel plan in an unmanned autonomous travel section extending to a boarding point of a driver, and the driver drives the vehicle from the boarding point based on a driving plan, in which a traffic condition of the unmanned autonomous travel section is predicted for preparation of the travel plan and the driving plan, and the travel plan for the vehicle traveling in the unmanned autonomous travel section and the driving plan are changed depending on a traffic event in the unmanned autonomous travel section.

(Note 10) The transportation management apparatus according to note 9, in which a date and time of scheduled boarding in the driving plan are changed depending on the traffic event in the unmanned autonomous travel section.

(Note 11) The transportation management apparatus according to note 9 or 10, in which the boarding point in the travel plan and the boarding point in the driving plan are changed.

(Note 12) The transportation management apparatus according to note 11, in which, depending on the traffic event in the unmanned autonomous travel section, it is judged whether or not the boarding point is to be changed, and the boarding point is changed when it is judged that the boarding point is to be changed, or the boarding point is not changed when it is judged that the boarding point is not to be changed.

(Note 13) A transportation management method for managing a transportation system for transportation of goods or the like in which a vehicle is caused to perform unmanned autonomous travel based on a travel plan in an unmanned autonomous travel section extending to a boarding point of a driver, and the driver drives the vehicle from the boarding point based on a driving plan, the transportation management method including: predicting a traffic condition of the unmanned autonomous travel section to prepare the travel plan and the driving plan; and changing the travel plan for the vehicle traveling in the unmanned autonomous travel section and the driving plan depending on a traffic event in the unmanned autonomous travel section.

This application is based on Japanese Patent Application No. 2019-068882 filed on Mar. 29, 2019, the disclosure of which including the specification, drawings and abstract is incorporated herein by reference in its entirety.

INDUSTRIAL APPLICABILITY

According to the transportation management apparatus and the transportation management method on the present disclosure, it is possible to provide a technique of changing, depending on an anomaly in the vehicle that has occurred, a travel plan for a vehicle in a transportation system for causing a vehicle to perform unmanned autonomous travel to a destination based on a travel plan to transport goods or the like.

REFERENCE SIGNS LIST

1 Transportation system
10 Transportation management system
100 Transportation management apparatus
101 Storage section
101a Map information DB
101b Traffic information DB
101c Transportation plan DB
102 Control section
102a Transportation plan preparation section
102b Transportation plan change section
102c Vehicle state management section
102d Goods compartment condition management section
103 Communication control I/F section
104 Input/output I/F section
105 Operation section
106 Display section
200 In-vehicle system
201 GPS reception section
202 Navigation section
203 Map information DB
204 Travel plan storage section
205 Vehicle-external-condition detection section
206 Goods compartment condition detection section
207 Locking section
208 Drive control section
209 Driving control section
210 Communication control I/F section
211 Input/output I/F section
212 Operation section
213 Audio input/output section
214 Display section
300 Driver terminal
301 GPS reception section
302 Key information storage section
303 Driving plan storage section
304 Terminal control section
305 Communication control I/F section
306 Input/output I/F section
307 Operation section
308 Audio input/output section
309 Display section
400 Network

What is claimed is:

1. A transportation management apparatus comprising a processor, the transportation management apparatus manages a transportation system for causing a vehicle to perform unmanned autonomous travel to a destination based on a travel plan to transport goods or the like,
the processor is configured to:
judge whether or not the destination of the vehicle is to be changed when it is detected that a goods collapse has occurred in a goods compartment of the vehicle of the unmanned autonomous travel; and
instruct the vehicle to reduce its travel speed when the destination is changed.

2. The transportation management apparatus according to claim 1, wherein the processor is further configured to
notify a handler of the destination changed, when the destination is changed.

3. The transportation management apparatus according to claim 1, wherein the processor is further configured to
arrange a handler vehicle that travels to the destination changed, when the destination is changed.

4. A transportation management method performed by a transportation management apparatus comprising a processor, the transportation management apparatus manages a transportation system for causing a vehicle to perform unmanned autonomous travel to a destination based on a travel plan to transport goods or the like,
the processor is configured to:
judge whether or not the destination of the vehicle is to be changed when it is detected that a goods collapse has occurred in a goods compartment of the vehicle of the unmanned autonomous travel; and
instruct the vehicle to reduce its travel speed when the destination is changed.

\* \* \* \* \*